US008243299B2

(12) United States Patent
Okada

(10) Patent No.: US 8,243,299 B2
(45) Date of Patent: Aug. 14, 2012

(54) PRINTING APPARATUS WITH RECOVERY FROM INTERRUPTION FACTOR, CONTROLLING METHOD, AND STORAGE MEDIUM

(75) Inventor: Hideyuki Okada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 960 days.

(21) Appl. No.: 12/239,040

(22) Filed: Sep. 26, 2008

(65) Prior Publication Data

US 2009/0097060 A1 Apr. 16, 2009

(30) Foreign Application Priority Data

Oct. 10, 2007 (JP) ................................ 2007-264756

(51) Int. Cl.
*G06K 15/00* (2006.01)
*G03G 15/00* (2006.01)

(52) U.S. Cl. .................... 358/1.14; 358/1.12; 358/1.13; 358/1.15; 399/19; 399/82

(58) Field of Classification Search .................. 358/1.1, 358/1.14, 1.15, 1.9, 1.18, 1.16, 1.12; 399/19, 399/83, 82
See application file for complete search history.

(56) References Cited

U.S. PATENT DOCUMENTS

| | | | | |
|---|---|---|---|---|
| 4,388,023 | A * | 6/1983 | Cochrane | 405/195.1 |
| 5,626,757 | A * | 5/1997 | Armstrong | 210/635 |
| 6,661,978 | B2 * | 12/2003 | Brewington | 399/19 |
| 7,327,259 | B2 * | 2/2008 | Kim et al. | 340/572.1 |
| 7,545,523 | B2 * | 6/2009 | Schmidt et al. | 358/1.14 |
| 7,590,380 | B2 * | 9/2009 | Mima | 399/408 |
| 7,684,064 | B2 * | 3/2010 | Kimura et al. | 358/1.14 |
| 7,969,593 | B2 * | 6/2011 | Toda | 358/1.14 |
| 2003/0076525 | A1 * | 4/2003 | Hikawa | 358/1.14 |
| 2003/0095279 | A1 * | 5/2003 | Kim | 358/1.14 |
| 2004/0190057 | A1 | 9/2004 | Takahashi et al. | |
| 2007/0019224 | A1 * | 1/2007 | Okada et al. | 358/1.13 |
| 2007/0046973 | A1 * | 3/2007 | Toda | 358/1.13 |
| 2007/0171454 | A1 * | 7/2007 | Takahashi et al. | 358/1.14 |

FOREIGN PATENT DOCUMENTS

| | | |
|---|---|---|
| JP | 2005-206264 A | 8/2005 |
| JP | 2005-210754 A | 8/2005 |

OTHER PUBLICATIONS

Office Action dated Apr. 3, 2012, in counterpart Japanese Patent Application No. 2007-264756.

* cited by examiner

*Primary Examiner* — Twyler Haskins
*Assistant Examiner* — Dennis Dicker
(74) *Attorney, Agent, or Firm* — Fitzpatrick, Cella, Harper & Scinto

(57) ABSTRACT

A printing system which enables to improve its flexibility, convenience, and/or productivity by utilizing a post-processing by a post-processor connected to a printer without printing by a printer. An execution request is received for a specific type of job executing a post-processing by a post-processor connected to a printer without printing by the printer. The post-processor is caused to execute the post-processing for a first printed matter previously generated for the specific type of job without printing by the printer when receiving the execution request. Print data is received which is utilized for generating the first printed matter. The printer is caused to generate a second printed matter corresponding to the first printed matter, by using the print data.

8 Claims, 20 Drawing Sheets

PRINTING APPARATUS WITH RECOVERY FROM INTERRUPTION FACTOR, CONTROLLING METHOD, AND STORAGE MEDIUM

BACKGROUND OF THE INVENTION

1. Field of the Invention

The present invention relates to a printing system, a controlling method, a storing medium, and a program, and more particularly, to a printing system, a controlling method, a storing medium, and a program which enables to execute a post-processing by a post-processing unit connected to a printer without printing by a printer.

2. Description of the Related Art

In recent years, a POD (Print On Demand) printing system has been proposed against the conventional printing industry, in which a printer by an electro-photographic method or a printer by an inkjet method is utilized (see U.S. Patent Public No. 2004/0190057). The POD printing system needs no complicated operation such as printing production work.

However, assuming that it is planned to commercialize the POD printing system, there still seems to exist remaining items to be studied. For example, a conventional printing system is not configured to utilize the post-processing by an inline-finisher (a finisher in which a printer and a sheet path are combined) connected to the printer without printing by the printer. Thus, such a printing system should be proposed for future demand, which enables the utilization of the post-processing by the post processing unit connected to a printing unit without printing by the printing unit. However, currently, since there is not such a demand itself, no effective proposal has been provided.

SUMMARY OF THE INVENTION

The present invention provides a printing system, a controlling method, a storing medium, and a program which enables to improve its flexibility, convenience, and/or productivity by utilizing a post-processing by a post-processor connected to a printer without printing by a printer.

In a first aspect of the present invention, there is provided with a printing system, comprising an execution request receiving unit adapted to receive an execution request for a specific type of job executing a post-processing by a post-processor connected to a printer without printing by a printer, a first controlling unit adapted to cause the post-processor to execute the post-processing for a first printed matter previously generated for the specific type of job without printing by the printer when receiving the execution request, a print data receiving unit adapted to receive print data utilized for generating the first printed matter, and a second controlling unit adapted to cause the printer to generate a second printed matter corresponding to the first printed matter, by using the print data.

According to the present invention, the printing system enables to improve its flexibility, convenience, and/or productivity by utilizing the post-processing by the post-processing unit connected to the printing unit without printing by the printing unit.

The above and other objects, features, and advantages of the invention will become more apparent from the following detailed description taken in conjunction with the accompanying drawings.

DESCRIPTION OF THE EMBODIMENTS

The present invention will now be described in detail with reference to the drawings showing preferred embodiments thereof. It should be noted that the relative arrangement of the components, the numerical expressions and numerical values set forth in these embodiments do not limit the scope of the present invention unless it is specifically stated otherwise.

Figure 1:
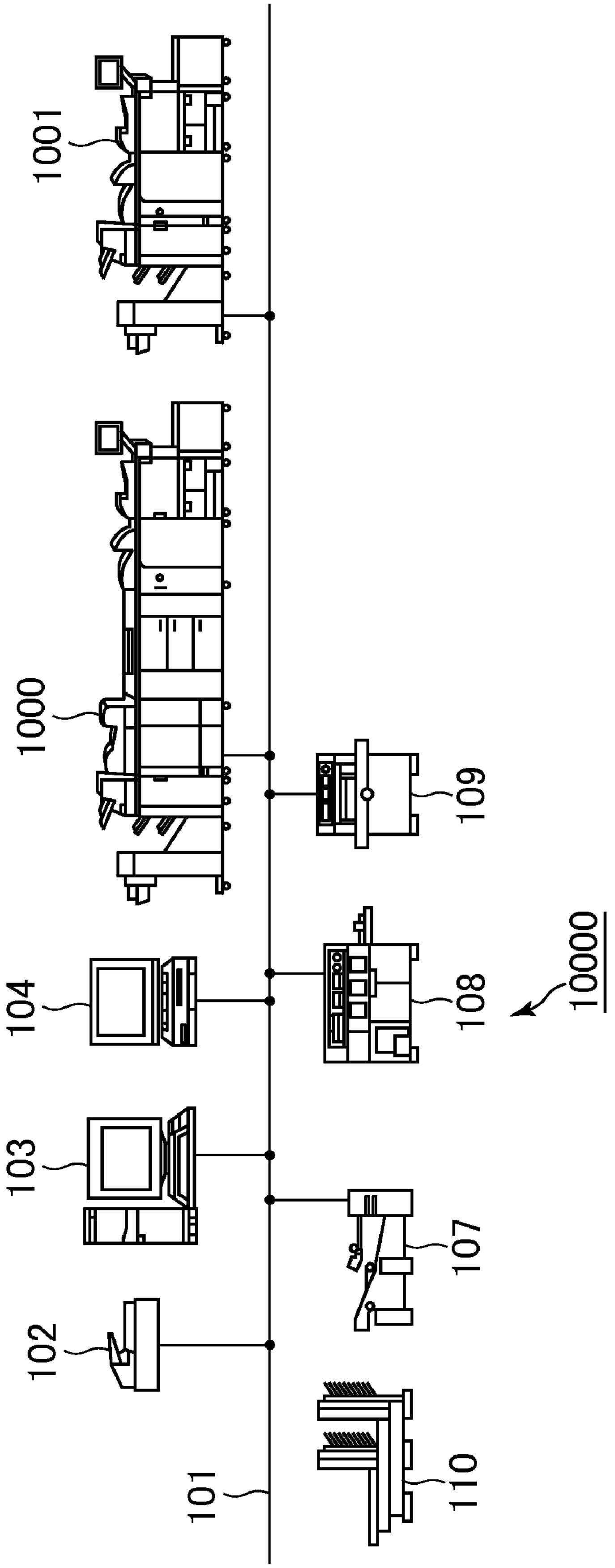
FIG. 1 is a diagram showing an overall configuration of a POD printing system according to an embodiment of the present invention.

FIG. 1 is a diagram showing an overall configuration of a POD printing system according to an embodiment of the present invention. In FIG. 1, a POD printing system 10000 includes printing systems 1000 and 1001, a scanner 102, a server computer 103 (PC 103), and a client computer 104 (PC 104), all of which are connected to each other through a network 101. The POD printing system 10000 includes a folding apparatus 107, a cutting apparatus 109, a saddle stitching book-binding apparatus 110, a casing-in book-binding apparatus 108, and the like.

Figure 2:
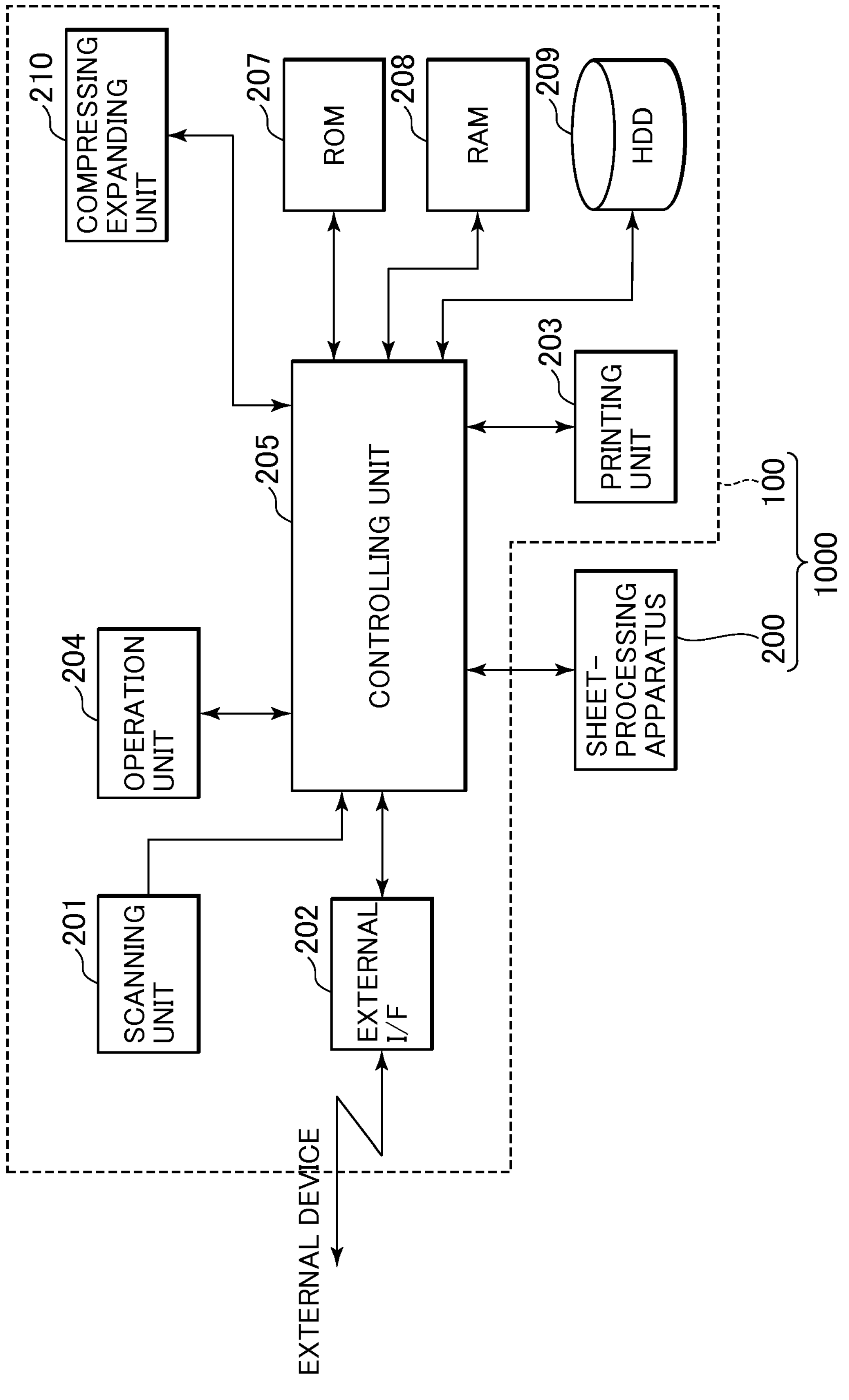
FIG. 2 is a diagram showing an internal configuration of the printing system of FIG. 1.

FIG. 2 is a diagram showing an internal configuration of the printing system 1000 of FIG. 1. Meanwhile, since the internal configuration of the printing system 1001 is the same as that of the printing system 1000, and duplicate description of components corresponding to those in the printing system 1000 is omitted by designating them using the same reference numerals. In FIG. 2, the printing system 1000 includes a printer 100, and a sheet-processing apparatus 200. Meanwhile, in the present embodiment, an MFP (Multi Function Peripheral) having a plurality of functions of copying and printing and others will be described as an example of the printer 100. However, the printer 100 may be a single function-type printer including only a copying function or a printing function.

Referring to FIG. 1 again, the PC 103 manages data to be transmitted and received among a variety of apparatuses connected to the network 101. The PC 104 transmits image data to the printer 100 or the PC 103 through the network 101. The folding apparatus 107 executes a folding process for a sheet printed by the printer 100. The casing-in book-binding apparatus 108 executes a casing-in book-binding process for the sheet printed by the printer 100. The cutting apparatus 109 executes a cutting process for the sheet printed by the printer 100 in each sheet bundle. The saddle stitching book-binding apparatus 110 executes a saddle stitching book-binding process for the sheet printed by the printer 100.

When utilizing one of post-processing units such as the folding apparatus 107, the casing-in book-binding apparatus 108, the cutting apparatus 109, and the saddle stitching book-binding apparatus 110, a user picks up the sheet printed by the printer 100 from the printing systems 1000 and 1001, sets the sheet to the post-processing unit to be utilized, and causes the unit to process the sheet. In a plurality of the post-processing units included by the POD system 10000 of FIG. 1, the apparatuses other than the saddle stitching book-binding apparatus 110 are connected to the network 101, and are configured so as to be able to communicate data with each other.

Next, a configuration of the printing system 1000 will be described by using a system block diagram of FIG. 2.

Units other than the sheet-processing apparatus 200 of the units included in the printing system 1000 illustrated in FIG. 2 are included in the printer 100. The printer 100 can be connected to the arbitrary number of the sheet-processing apparatuses 200.

The printing system 1000 is configured so that the sheet-processing for the sheet printed by the printer 100 can be executed by the sheet-processing apparatus 200 connected to the printer 100. However, the printing system 1000 can be also configured with only the printer 100 without connecting the sheet-processing apparatus 200.

The sheet-processing apparatus 200 is configured so as to be able to communicate with the printer 100, and can receive an instruction from the printer 100 to execute the after-mentioned sheet-processing. A scanning unit 201 reads an image on a document, converts the image to image data, and transfers the image data to other units. An external I/F 202 transmits/receives data to/from other apparatuses connected to the network 101. A printing unit 203 prints an image based on inputted image data on a sheet. An operation unit 204 includes a hard key inputting unit (key inputting unit) 402 and a touch panel unit 401 which are after-mentioned in FIG. 6, and receives an instruction from a user therethrough. The operation unit 204 displays a variety of displays on the touch panel unit 401.

A controlling unit 205 totally controls a process, an operation, and the like of a variety of the units included by the printing system 1000. That is, the controlling unit 205 controls the operations of not only the printer 100, but also the sheet-processing apparatus 200 connected to the printer 100.

A ROM 207 stores a variety of computer programs executed by the controlling unit 205.

For example, the ROM 207 stores a program for causing the controlling unit 205 to execute a variety of processes of after-mentioned flowcharts, and a display controlling program for displaying a variety of after-mentioned setting screens. The ROM 207 stores a program for executing such an operation that the controlling unit 205 interprets PDL (Page description Language) code data received from the PC 103, the PC 104, or the like, and develop the PDL code data to raster image data. In addition, the ROM 207 stores a boot sequence, font information, and the like.

A RAM 208 stores image data transferred from the scanning unit 201 or the external I/F 202, and a variety of the programs and setting information loaded from the ROM 207. The RAM 208 stores information on the sheet-processing apparatus 200 (the number (numerical range: 0 to n) of the sheet-processing apparatuses 200 connected to the printer 100, information on each function of the sheet-processing apparatus 200, a connection order of each of the sheet-processing apparatuses 200, and the like).

A HDD (Hard Disk Drive) 209 is configured with a hard disk, and a driving unit reading/writing data from/to the hard disk, and the like. The HDD 209 is a large-capacity storing apparatus for storing image data which is inputted from the scanning unit 201 or the external I/F 202 to be compressed by a compressing expanding unit 210.

Based on the instruction from the user, the controlling unit 205 can control the printing unit 203 to print the image data stored in the HDD 209. Based on the instruction from the user, the controlling unit 205 can also transmit the image data stored in the HDD 209 to an external apparatus such as the PC 103, and the printing systems 1000 and 1001 through the external I/F 202. The controlling unit 205 can also obtain the image data from the external apparatus such as the PC 103, and the printing systems 1000 and 1001 through the external I/F 202. The controlling unit 205 can also search, through the external I/F 202, the external apparatuses connected to the network 101.

The compressing expanding unit 210 executes a compressing/expanding operation for the image data, and the like stored in the RAM 208 and the HDD 209 by a variety of compressing methods such as the JBIG and the JPEG.

Figure 3:
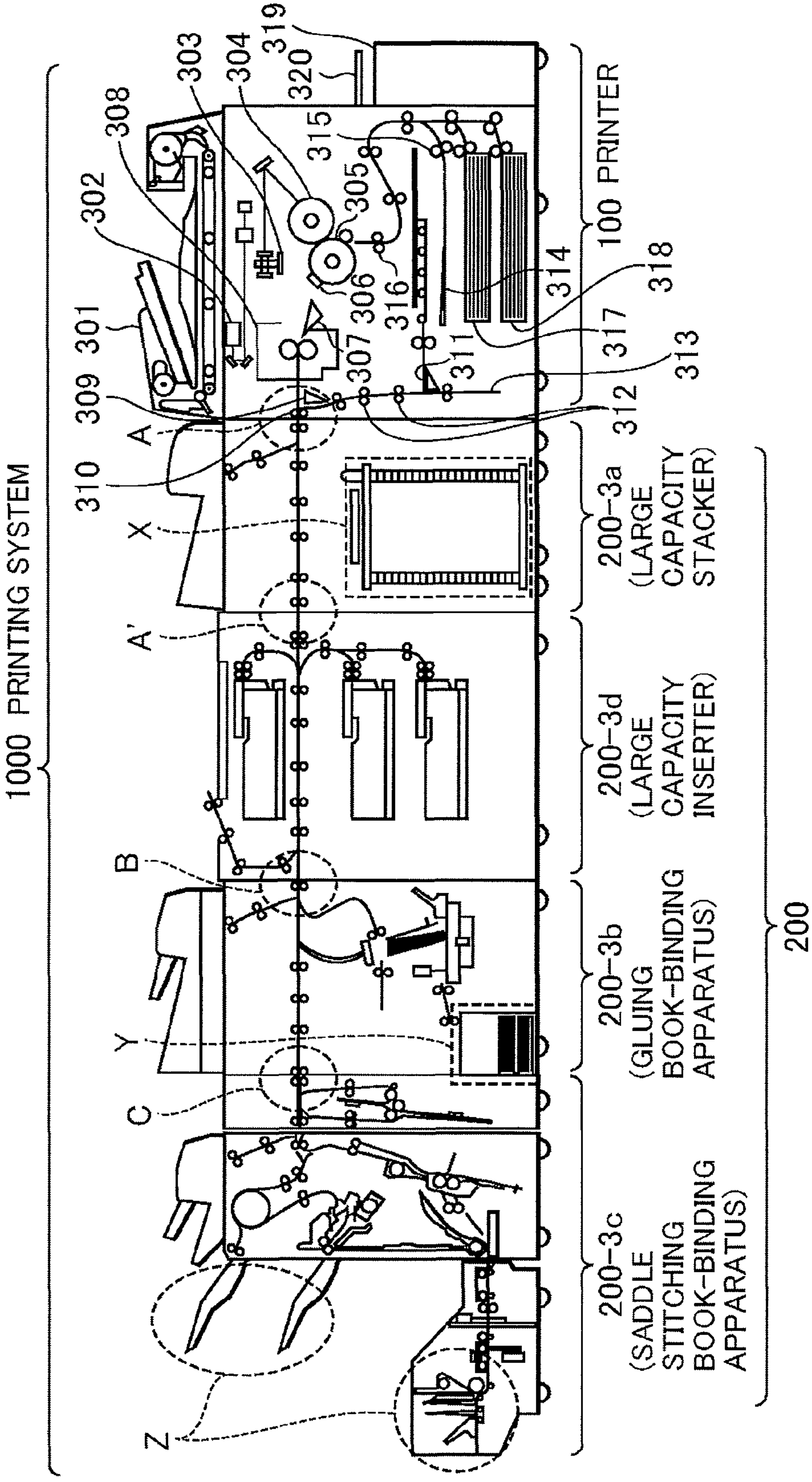
FIG. 3 is a cross-sectional view showing a printer and a sheet-processing apparatus connected to the printer shown in FIG. 2.

Next, a configuration of the printing system 1000 will be described by using FIG. 3. FIG. 3 is a cross-sectional view showing the printer 100 and the sheet-processing apparatus 200 connected to the printer 100 shown in FIG. 2.

An automatic document transporting apparatus (ADF) 301 separates a document bundle set on a mounting surface of a document tray from a first page in a page number order, and transports the separated document on a platen glass to scan the document with a scanner 302. The scanner 302 reads an image of the document transported on the platen glass, and converts the read image to image data with a CCD (not-illustrated). A rotating multifaceted mirror (polygon mirror, or the like) 303 causes light modulated according to the image data, such as laser light, to irradiate to a photosensitive drum 304 as reflected scanning light through a reflecting mirror.

A latent image formed by the laser light on the photosensitive drum 304 is developed with toner, and a toner image is transferred to sheet material applied on a transfer drum 305. By sequentially executing the above series of image forming processes for the toners of yellow (Y), magenta (M), cyan (C), and black (B), a full-color image is formed. After four times of the image forming processes, the sheet material on the transfer drum 305, in which the full-color image is formed, is separated by a separating pawl 306, and is transported by a prefixing transporting unit 307 to a fixing unit 308.

The fixing unit 308 is configured with a combination of a roller and a belt, incorporates a heat source such as a halogen heater, and dissolves and fixes the toners on the sheet material, in which the toner image is transferred, with heat and pressure. A sheet discharging flapper 309 is configured so as to be able to be rocked with a pivot shaft in the center, and defines a transporting direction of the sheet material. When the sheet discharging flapper 309 is rocked in a clockwise direction in the figure, the sheet material is straightly transported, and is discharged by a sheet discharging roller 310 outside the apparatus. The controlling unit 205 controls the printer 100 to execute the single side printing according to a series of the above sequences.

On the other hand, when the image is formed on both sides of the sheet material, the sheet discharging flapper 309 is rocked in a counterclockwise direction in the figure, a transporting path of the sheet material is changed in the down direction, and the sheet material is transferred to a both side transporting unit. The both side transporting unit is provided with an inverting flapper 311, an inverting roller 312, an inverting guide 313, and both side tray 314. The inverting flapper 311 is rocked with the pivot shaft in the center, and defines the transporting direction of the sheet material.

When processing a both sides printing job, the controlling unit 205 (FIG. 2) controls to rock the inverting flapper 311 in a counterclockwise direction in the figure, and to transfer a sheet, whose first side has been printed by the printing unit 203, to the inverting guide 313 through the inverting roller 312. Next, the controlling unit 205 causes the inverting roller 312 to temporarily stop while a back side end of the sheet is being tightly held by the inverting roller 312, continuously causes the inverting flapper 311 to be rocked in a clockwise direction in the figure, and also causes the inverting roller 312 to rotate in a reverse direction. Thereby, the controlling unit 205 controls to cause the sheet to be switched back to be transported, and to lead the sheet to the both side tray 314 while a back side end and a front side end of the sheet are being replaced.

In the both side tray 314, the sheet is temporarily mounted, and is later transferred again by a paper-refeeding roller 315 to a regist-roller 316. In this case, the sheet is transferred with a side (a second side), which is opposite at the transferring process of the first time, facing the photosensitive drum 304. As in the above process, an image of the second side is formed for the second side of the sheet. Thereby, the images are formed on both sides of the sheet, and the sheet passes through the fixing process and is discharged from the main body of the printer 100 to outside of the apparatus through sheet discharging roller 310. The controlling unit 205 controls the printer 100 to execute the both side printing in a series of the above sequences.

The printer 100 includes a paper-feeding unit storing the sheet to be used for the printing process. The paper-feeding unit corresponds to paper-feeding cassettes 317 and 318 (for example, 500 sheets can be stored therein respectively), a paper-feeding deck 319 (for example, 500 sheets can be stored therein), a manual-feeding tray 320, and the like. A variety of the sheets, whose size and material are different, can be set with the size and material distinguished in each of the paper-feeding cassettes 317 and 318, and the paper-feeding deck 319. A variety of the sheets including a special sheet such as an OHP sheet can be set in the manual-feeding tray 320. A paper-feeding roller is provided in each of the paper-feeding cassettes 317 and 318, the paper-feeding deck 319, and the manual-feeding tray 320, and the sheet is continuously fed one by one by the paper-feeding roller.

Next, the sheet-processing apparatus 200 illustrated in FIG. 3 will be described.

In the sheet-processing apparatus 200 of the printing system 1000 according to the present embodiment, when the sheet can be transported from an upstream apparatus to a downstream apparatus through a sheet-transporting path, an arbitrary type of and the arbitrary number of apparatuses can be combined. For example, as illustrated in FIG. 3, in the order of the closeness to the printer 100, the sheet-processing apparatuses 200 of a large-capacity stacker **200-3*a*, a large-capacity inserter 200-3*d*, a gluing book-binding apparatus 200-3*b*, and a saddle stitching book-binding apparatus 200-3*c* are combined in the order of the above description, and can be selectively utilized in the printing system 1000. Each of the sheet-processing apparatuses 200 is provided with a sheet discharging unit, and the user can pick up the sheet-processed sheet from the sheet discharging unit of each of the sheet-processing apparatuses 200**.

The controlling unit 205 receives an execution request for the sheet-processing whose type is desired by the user from candidates of the sheet-processing whose type can be executed by the sheet-processing apparatuses 200 connected to the printer 100 along with a printing execution request through the operation unit 204. In response to receiving the printing execution request of a job to be processed from the user through the operation unit 204, the controlling unit 205 causes the printing unit 203 to execute the printing process required by the job. Next, the controlling unit 205 causes the sheet of the job whose printing process has been executed to be transported up to the sheet-processing apparatus 200, in which the sheet-processing desired by the user can be executed, through the sheet transporting path, and causes the sheet-processing apparatus 200 to execute the sheet-processing for the transported sheet.

For example, when a configuration of the printing system 1000 is a system configuration illustrated in FIG. 3, it is assumed that the job to be processed, whose printing execution request is received from the user, is a job which is instructed to execute a large amount mounting process by the large-capacity stacker **200-3*a***. This job is referred to as "stacker job".

When this stacker job is processed in the system configuration of FIG. 3, the controlling unit 205 causes the sheet of this job, which is printed by the printer 100, to pass through a point A of FIG. 3, and to be transported to inside of the large-capacity stacker **200-3*a*. After that, the controlling unit 205 causes the large-capacity stacker 200-3*a* to execute the mounting process of this job. Next, the controlling unit 205 does not transport the printed matter of this job, whose mounting process has been executed by the large-capacity stacker 200-3*a*, to another apparatus (for example, the apparatus of a subsequent stage), but causes the large-capacity stacker 200-3*a*** to hold the printed matter at a paper-discharging destination X therein.

The user can directly pick up the printed matter of the stacker job, which is held in the paper-discharging destination X of FIG. 3, from the paper-discharging destination X. Thereby, the above series of operations of the above other apparatuses and the user becomes unnecessary that the sheet is transported up to the paper-discharging destination Z in the down most-stream of the sheet-transporting direction of FIG. 3, and the printed matter of the stacker job is picked up from the paper-discharging destination Z by the user.

It is assumed in the system configuration of FIG. 3 that the job to be processed, whose printing execution request is received from the user, is a job instructed to execute the sheet-processing (for example, any gluing book-binding process among the casing-in book-binding process and a top gluing book-binding process) by the gluing book-binding apparatus 200-3*b*. This job is referred to as "gluing book-binding job".

When this gluing book-binding job is processed in the system configuration of FIG. 3, the controlling unit 205 causes the sheet printed by the printer 100 to be transported to inside of the gluing book-binding apparatus 200-3*b* through the points A, A', and B of FIG. 3. After that, the controlling unit 205 causes the gluing book-binding apparatus 200-3*b* to execute the gluing book-binding process for this job. Next, the controlling unit 205 does not cause the printed matter of this job, in which the gluing book-binding process has been executed by the gluing book-binding apparatus 200-3*b*, to be transported to another apparatus (for example, the apparatus of a subsequent stage), but causes the gluing book-binding apparatus 200-3*b* to directly hold the printed matter to a paper-discharging destination Y therein.

For example, it is assumed in the system configuration of FIG. 3 that the job to be processed, whose printing execution request is received from the user, is a job instructed to execute the sheet-processing by the saddle stitching book-binding apparatus 200-3*c*. The sheet-processing by the saddle stitching book-binding apparatus 200-3*c* corresponds to, for example, a saddle stitching book-binding, a punching process, a cutting process, the shift paper-discharging process, and a folding process. Here, this job is referred to as "saddle stitching book-binding job".

When this saddle stitching book-binding job is processed in the system configuration of FIG. 3, the controlling unit 205 causes the sheet of this job, which is printed by the printer 100, to be transported to the saddle stitching book-binding apparatus 200-3*c* through the points A, A', B, and C. After that, the controlling unit 205 causes the saddle stitching book-binding apparatus 200-3*c* to execute the sheet-processing of this job. Next, the controlling unit 205 causes the saddle stitching book-binding apparatus 200-3*c* to hold at a paper-discharging destination Z therein the printed matter of the saddle stitching book-binding job, in which the sheet-processing has been executed by the saddle stitching book-binding apparatus 200-3*c*.

Meanwhile, the paper-discharging destination Z corresponds to a plurality of paper-discharging candidates. This is because the saddle stitching book-binding apparatus 200-3*c* can execute a plurality of types of the sheet-processing, and is used to distinguish the paper-discharging destination for each sheet-processing.

For example, it is assumed in the system configuration of FIG. 3 that the job to be processed, whose printing execution request is received from the user, is a job instructed to execute the sheet-processing by the large-capacity inserter 200-3*d*. This job is referred to as "inserter paper-feeding job". The sheet-processing apparatus connected in the downstream can be further used for this inserter paper-feeding job.

Such a case will be considered that this inserter paper-feeding job is processed in the system configuration of FIG. 3. In this case, the controlling unit 205 inserts the sheet fed from the large-capacity inserter 200-3*d* to the sheet of this job, which is printed by the printer 100, and transports the sheets up to the corresponding sheet-processing apparatus according to the designated sheet-processing. Next, the controlling unit 205 executes the sheet-processing. In the system of FIG. 3, since the gluing book-binding apparatus 200-3*b* and the saddle stitching book-binding apparatus 200-3*c* are connected in the downstream of the large-capacity inserter 200-3*d*, the inserter paper-feeding job can be included in the above-mentioned gluing book-binding job and saddle stitching book-binding. The inserter paper-feeding job does not necessarily include a printing job by the printer 100. That is, only the sheet fed from the large-capacity inserter 200-3*d* is transported to the downstream, and can be sheet-processed by using the designated sheet-processing apparatus 200.

As described in FIG. 1 to FIG. 3, in the printing system 1000 of the present embodiment, a plurality of the sheet-processing apparatuses 200 can be connected to the printer 100. In addition, an arbitrary combination of a plurality of the sheet-processing apparatuses 200 can be connected to the printer 100. A connection order of a plurality of the sheet-processing apparatuses 200 can be freely changed in such an area that the sheet transporting paths of the apparatuses can be connected to each other. There exist a plurality of types of the sheet-processing apparatuses 200, which can be connected to the printer 100.

Next, the internal configurations of the gluing book-binding apparatus 200-3*b*, the saddle stitching book-binding apparatus 200-3*c*, and the large-capacity inserter 200-3*d*, which are the sheet-processing apparatuses 200 being connectable with the printer 100, will be described by using FIG. 4 to FIG. 5, and FIG. 8.

Figure 4:
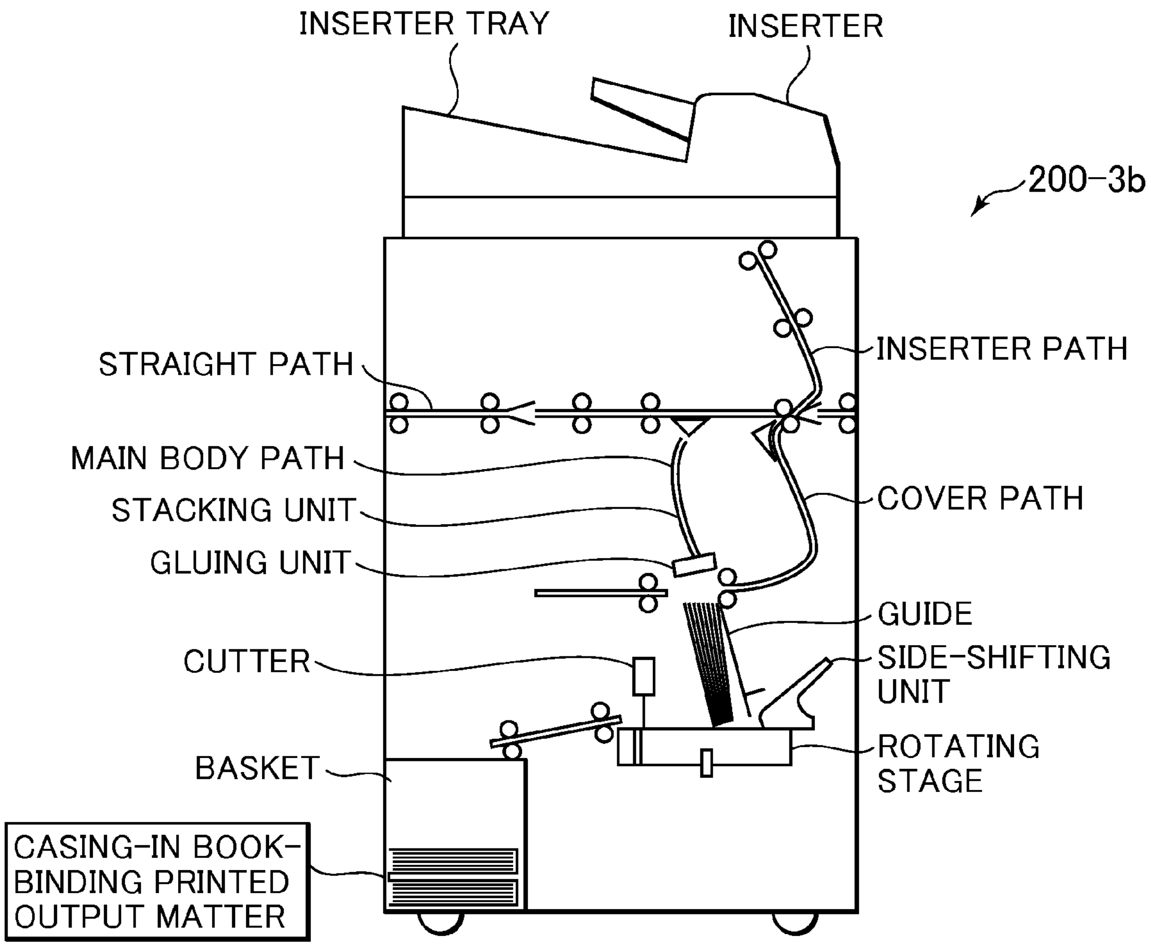
FIG. 4 is a cross-sectional view illustrating an internal configuration of a gluing book-binding apparatus shown in FIG. 3.

FIG. 4 is a cross-sectional view illustrating the internal configuration of the gluing book-binding apparatus 200-3*b* shown in FIG. 3.

In FIG. 4, the gluing book-binding apparatus 200-3*b* selectively transports the sheet transported from the upstream apparatus to the three transporting paths. One path is a cover path, one path is a main body path, and one path is a straight path. The gluing book-binding apparatus 200-3*b* also includes an inserter path. The inserter path is a sheet-transporting path for transporting the sheet placed on an inserter tray to the cover path.

The straight path, illustrated in FIG. 4, of the gluing book-binding apparatus 200-3*b* is a sheet-transporting path for transporting the sheet of the job, which does not need the gluing book-binding process by the gluing book-binding apparatus 200-3*b*, to the apparatus in the subsequent stage.

The main body path and the cover path, illustrated in FIG. 4, of the gluing book-binding apparatus 200-3*b* are the sheet-transporting paths for transporting the sheet needed for generating the casing-in book-binding printed matter.

For example, when the casing-in book-binding printed matter is generated by using the gluing book-binding apparatus 200-3*b*, the controlling unit 205 causes the printing unit 203 to print image data for a body text, which is to be printed on the sheet for the body text of the casing-in book-binding printed matter. When a copy of the casing-in book-binding printed matter is generated, a copy of the sheet bundle of the sheet for the body text is enwrapped by one cover. This sheet bundle for the body text is referred to as "main body".

The controlling unit 205 controls to transport the sheet, which becomes the main body and is printed by the printer 100, to the main body path illustrated in FIG. 4. When executing the casing-in book-binding process, the controlling unit 205 executes a process for enwrapping the main body printed by the printer 100 with the sheet for the cover, which is transported through the cover path.

For example, the controlling unit 205 causes a stacking unit to sequentially stack the sheet, which is transported from the apparatus in the upstream side and becomes the main body, through the main body path of FIG. 4. When the number, which corresponds to one booklet, of the sheets, in which the body text data is printed, are stacked in the stacking unit, the controlling unit 205 causes one sheet for the cover, which is needed by the job, to be transported through the cover path. The controlling unit 205 controls a gluing unit of FIG. 4 to execute a gluing process for a spine part of one set of the sheet bundle corresponding to this main body.

After that, the controlling unit 205 controls to bond this spine part of the main body and a center part of the sheet for the cover at a gluing unit. When the main body is bonded to the cover, the main body is transported so as to be pushed in the lower side of the apparatus. Thereby, a folding process for the cover is executed so that the main body is enwrapped with one cover. After that, one set of the sheet bundle is stacked on a rotating stage of FIG. 4 as following a guide.

After one set of the sheet bundle is set on the rotating stage, the controlling unit 205 causes a cutting unit of FIG. 4 to execute a cutting process for this sheet bundle. In this case, the cutting unit can execute a three sides cutting process for cutting three edge parts other than an edge part corresponding to the spine part of one set of this sheet bundle.

After that, the controlling unit 205 pushes out the three sides-cut sheet bundle in a basket direction by using a side-shifting unit, and causes a basket to store the sheet bundle.

The gluing book-binding apparatus 200-3*b* not only processes the sheet transported from the upstream apparatus, but also can execute the casing-in book-binding process or a top gluing process per se. For example, such a case will be described that the casing-in book-binding printed matter is generated by using the gluing book-binding apparatus 200-3*b* per se.

First, an operator sets the sheet to be processed to the inserter tray illustrated in FIG. 4. The controlling unit 205 causes an inserter also illustrated in FIG. 4 to feed the sheet set in the inserter tray, and first designates the sheet as the main body. Next, the controlling unit 205 controls to transport the sheet designated as the main body to the main body path illustrated FIG. 4. Next, the controlling unit 205 transports the sheet for the cover, which is also fed from the inserter tray, through the cover path, and executes the casing-in process for the main body sheet. In this case, the subsequent process is the same as the above.

Figure 5:
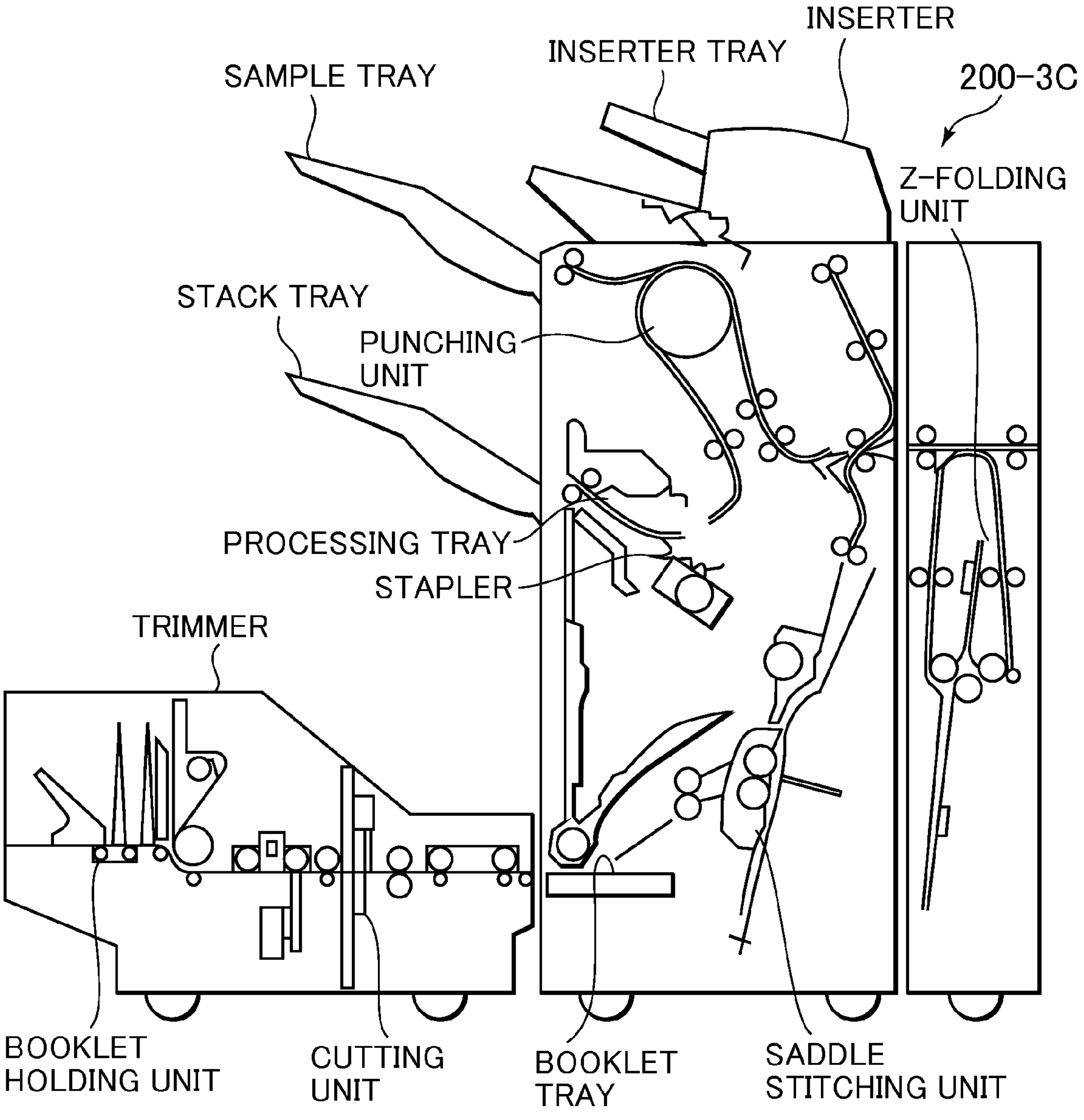
FIG. 5 is a cross-sectional view illustrating an internal configuration of a saddle stitching book-binding apparatus shown in FIG. 3.

FIG. 5 is a cross-sectional view illustrating an internal configuration of the saddle stitching book-binding apparatus 200-3*c* shown in FIG. 3.

In FIG. 5, the saddle stitching book-binding apparatus 200-3*c* is provided with a variety of units for selectively executing a stapling process, the cutting process, the punching process, a Z-folding process, a shifting discharging process, the saddle stitching book-binding process, and the like. The saddle stitching book-binding apparatus 200-3*c* does not include the straight path executing a function for transporting the sheet to the apparatus in the subsequent stage. Thus, when a plurality of the sheet-processing apparatuses 200 are connected to the printer 100, as illustrated in FIG. 3, the saddle stitching book-binding apparatus 200-3*c* is connected to the line end.

As illustrated in FIG. 5, the saddle stitching book-binding apparatus 200-3*c* includes a sample tray and a stack tray outside the apparatus, and includes a booklet tray inside the apparatus.

When being instructed to execute the stapling process in the saddle stitching book-binding apparatus 200-3*c*, the controlling unit 205 causes a processing tray inside the saddle stitching book-binding apparatus 200-3*c* to sequentially stack the sheet printed by the printer 100. When one bundle of the sheets is stacked in the processing tray, the controlling unit 205 causes a stapler to staple the bundle. After that, the controlling unit 205 causes the stapled sheet bundle to be discharged from the processing tray to the stack tray of FIG. 4.

When executing the job instructed for executing the Z-folding process in the saddle stitching book-binding apparatus 200-3*c*, the controlling unit 205 causes a Z-folding unit to execute the Z-shape folding process for the sheet printed by the printer 100. Next, the controlling unit 205 controls the folded sheet to pass through the saddle stitching book-binding apparatus 200-3*c*, and to be discharged to a discharging tray such as the stock tray and the sample tray.

When being instructed to execute the punching process in the saddle stitching book-binding apparatus 200-3*c*, the controlling unit 205 causes a puncher to execute the punching process for the sheet printed by the printer 100. Next, the controlling unit 205 controls the punched sheet to pass through the saddle stitching book-binding apparatus 200-3*c*, and to be discharged to the discharging tray such as the stock tray and the sample tray.

When executing the job instructed for executing the saddle stitching book-binding process in the saddle stitching book-binding apparatus 200-3*c*, the controlling unit 205 causes a saddle stitching unit to bind two points of a central part of the sheet bundle configured with one set of a plurality of the sheets. After that, the controlling unit 205 causes a roller to chew the central part of the sheet bundle to fold the sheet bundle in two based on the central part of the sheet bundle. Thereby, a booklet such as a pamphlet can be generated. The sheet bundle, to which the saddle stitching book-binding process is applied in the saddle stitching unit as described above, is transported to the booklet tray.

When the job instructed for executing the saddle stitching book-binding process also being instructed for executing the cutting process, the controlling unit 205 causes the saddle stitching book-bound sheet bundle to be transported from the booklet tray to a trimmer. After that, the controlling unit 205 causes the cutting unit to cut the sheet bundle transported to the trimmer, and causes a booklet holding unit to hold this sheet bundle. The saddle stitching book-binding apparatus 200-3*c* is also configured so that the three sides cutting process can be executed for the saddle stitching book-bound sheet bundle.

Meanwhile, when the saddle stitching book-binding apparatus 200-3*c* does not include the trimmer, the sheet bundle, which is book-bound by the saddle stitching unit, can be picked up from the booklet tray.

The saddle stitching book-binding apparatus 200-3*c* is configured so that the sheet (for example, previously-printed cover sheet) set in an inserter tray of FIG. 5 can be also attached to the sheet (printed by the printer 100) transported from the printer 100.

The saddle stitching book-binding apparatus 200-3*c* not only processes the sheet transported from the upstream apparatus, but also can execute per se the stapling process, the cutting process, the punching process, the Z-folding process, the shift discharging process, the saddle stitching bookbinding process, and the like. However, as referring to FIG. 5, the saddle stitching book-binding apparatus 200-3*c* is configured not to include a path for transporting the sheet fed by using the inserter to the Z-folding unit. Thus, the Z-folding process can not be realized by the saddle stitching book-binding apparatus 200-3*c* per se. However, the saddle stitching book-binding apparatus 200-3*c* is configured to be able to transport the sheet transported from the upstream to the Z-folding unit of FIG. 5. Thus, the sheet can be fed by using the inserter and the like provided in the sheet-processing apparatus 200 connected to the upstream, and can be sheet-processed by the Z-folding unit of FIG. 5. Thus, the saddle stitching book-binding apparatus 200-3*c* is configured to be able to execute only the sheet processing without using the printer 100.

Figure 8:
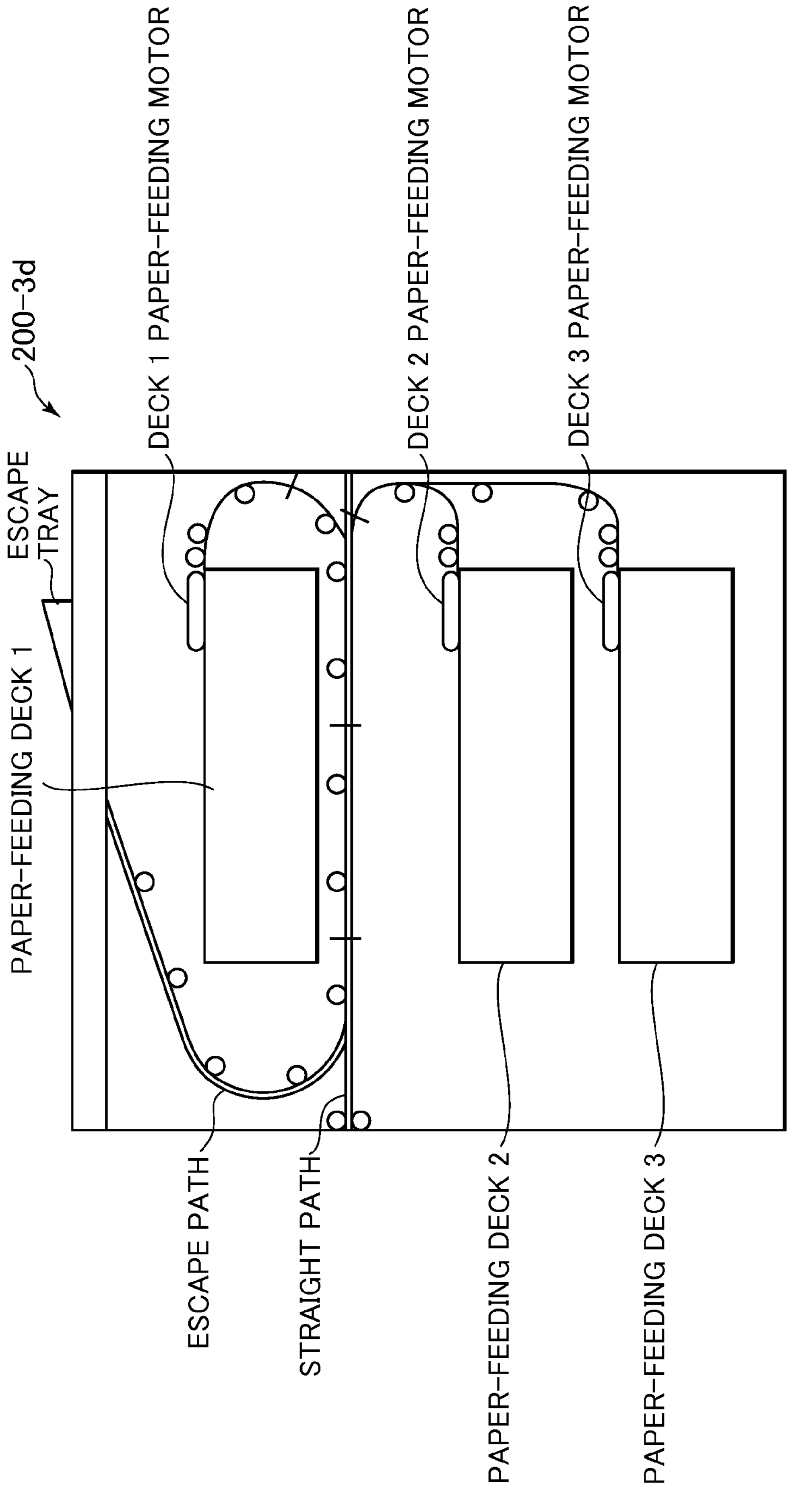
FIG. 8 is a cross-sectional view illustrating an internal configuration of a large-capacity inserter shown in FIG. 3.

FIG. 8 is a cross-sectional view illustrating an internal configuration of the large-capacity inserter 200-3*d* shown in FIG. 3. The large-capacity inserter 200-3*d* transports the sheet transported from the upstream apparatus to the downstream through the straight path, and also feeds the sheet set in each paper-feeding stage by using each paper-feeding motor, and transports the sheet to the downstream through the straight path.

An escape path is a sheet transporting path for discharging the sheet to an escape tray. The escape path is a sheet-transporting path for transporting a duplicated sheet to the escape tray when the sheet is detected to be a duplicated sheet in the paper-feeding.

Meanwhile, a plurality of sheet detecting sensors for detecting a sheet transportation condition and a sheet jam are provided in the sheet transporting path inside the large-capacity inserter 200-3*d*.

The large-capacity inserter 200-3*d* includes a not-illustrated CPU, and notifies the controlling unit 205 of sheet detection information from each of the sensors through a signal line for communicating data. Based on the information notified from the large-capacity inserter 200-3*d*, the controlling unit 205 recognizes the sheet transportation condition and the sheet jam inside the large-capacity inserter 200-3*d*. Meanwhile, when another sheet-processing apparatus is connected between the large-capacity inserter 200-3*d* and the printer 100, the not-illustrated CPU provided in the another sheet-processing apparatus 200 notifies the controlling unit 205 of information on the sensors of this large-capacity inserter 200-3*d*.

Figure 6:
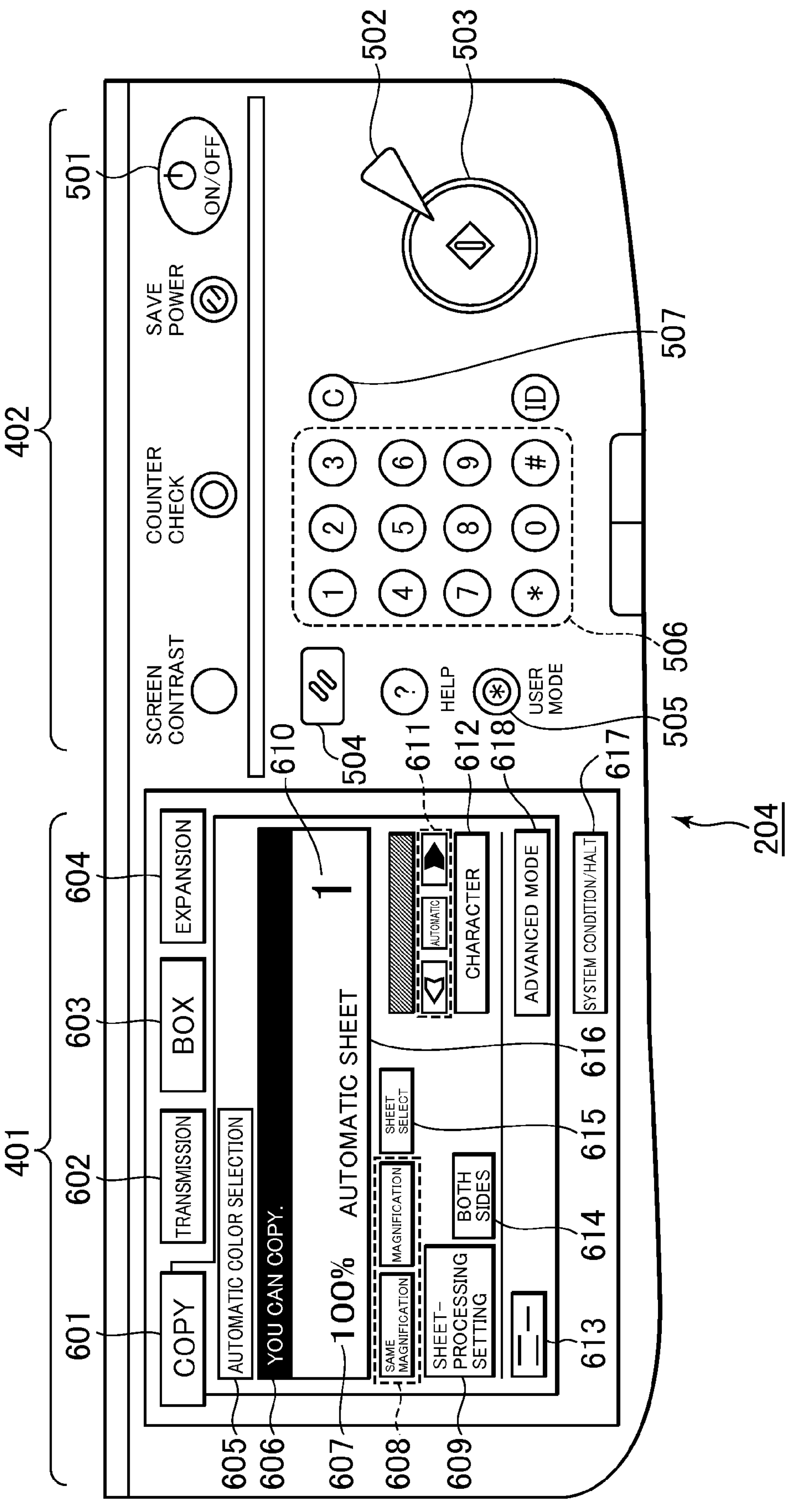
FIG. 6 is a diagram illustrating a configuration of an operation unit shown in FIG. 2.

FIG. 6 is a diagram illustrating a configuration of the operation unit 204 shown in FIG. 2.

In FIG. 6, the operation unit 204 includes a touch panel unit 401, and a key inputting unit 402. The touch panel unit 401 is configured with an LCD (Liquid Crystal Display), and a transparent electrode attached on the LCD, and displays a variety of setting screens for receiving the instruction from the user. The touch panel unit 401 is provided with both of a function for displaying a variety of screens and an instruction inputting function for receiving the instruction from the user. The key inputting unit 402 includes a power key 501, a start key 503, a stop key 502, a user mode key 505, and a ten-key numeric keypad 506. The start key 503 is used when causing the printer 100 to start executing a copy job and a transmission job. The ten-key numeric keypad 506 is used when setting a numerical value input such as the number of sheets to be printed.

The controlling unit 205 controls the printing system 1000 to execute a variety of processes based on a user instruction received through a variety of screens displayed on the touch panel unit 401 and the user instruction received through the key inputting unit 402.

Figure 7:
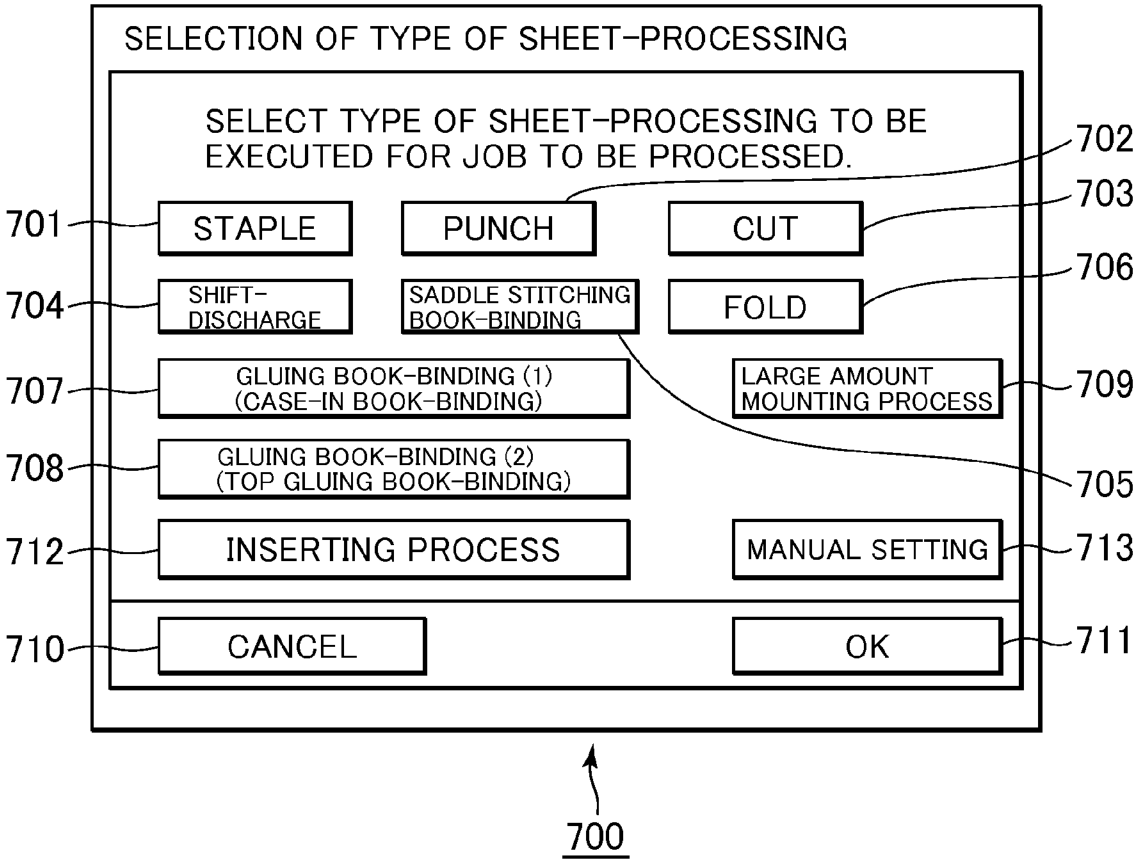
FIG. 7 is a diagram illustrating one of the setting screens displayed on a touch panel unit shown in FIG. 6.

FIG. 7 is a diagram illustrating one of a variety of the setting screens displayed on the touch panel unit 401 shown in FIG. 6. Specifically, the setting screen of FIG. 7 is a setting screen to cause the user to select a type of the sheet-processing to be executed for the sheet printed by the printer 100. When a sheet-processing setting key 609, which is illustrated in FIG. 6 on the screen displayed in the touch panel unit 401, is pushed by the user, the controlling unit 205 causes the touch panel unit 401 to display the screen of FIG. 7. The screen of FIG. 7 is a setting screen configured so that the user can select the type of the sheet-processing which can be executed by using the sheet-processing apparatus 200 included in the printing system 1000. The controlling unit 205, from the user through the screen of FIG. 7, receives the setting of the sheet-processing to be executed by the job to be processed, and causes the sheet-processing apparatus 200 to execute the sheet-processing according to the setting.

Meanwhile, in such a case that the sheet-processing apparatus 200 is connected to the printer 100, information may be configured so as to be able to be registered by the operator, which specifies the type of the sheet-processing apparatuses 200, the connection order of the sheet-processing apparatuses 200, the number of the sheet-processing apparatuses 200 to be connected, and the like.

For example, such a case will be considered that the operator registers the printing system 1000 illustrated in FIG. 3. In this case, registering information is set, which indicates such a fact that the four sheet-processing apparatuses 200 of the large-capacity stacker 200-3*a*, the large-capacity inserter 200-3*d*, the gluing book-binding apparatus 200-3*b*, and the saddle stitching book-binding apparatus 200-3*c* are connected to the printer 100 in order from the large-capacity stacker 200-3*a*. The controlling unit 205 causes the RAM 208 to hold information on the sheet-processing apparatus 200, which is set by the operator, as system configuration information, and arbitrarily reads and refers to the held information. Thereby, the controlling unit 205 can specify the type of the sheet-processing apparatuses 200, the connection order of the sheet-processing apparatuses 200, and the number of the connected sheet-processing apparatuses 200 for the printer 100.

Meanwhile, it is assumed that the user executes such a setting that the saddle stitching book-binding apparatus 200-3*c* without the straight path is connected halfway down the row of a plurality of the sheet-processing apparatuses 200. In this case, the controlling unit 205 causes the touch panel unit 401 to display an error message for notifying such a fact that the setting is designated to be invalid. Meanwhile, the controlling unit 205 may cause the touch panel unit 401 to display guidance information for notifying, without displaying such an error message, the operator that the saddle stitching book-binding apparatus 200-3*c* is to be connected to the line end.

while the operation unit 204 included in the printer 100 is used as a user interface unit applied to the printing system 1000 in the present embodiment, other apparatuses may be used. For example, the printing system 1000 may be configured to be able to execute the process based on an instruction from the user interface unit included in the external apparatus such as the PC 103 and the PC 104. As described above, when the printing system 1000 is remotely operated from the external apparatus, the setting screen regarding the printing system 1000 is displayed on the displaying unit of the external apparatus.

For example, the user interface will be described by using the PC 104. When a printing request is received from the user, a CPU included in the PC 104 causes a display to display the setting screen, and receives the setting for a printing process condition from the operator of the PC 104 through the displayed screen. When receiving the setting for the printing process condition from the operator, the CPU included in the PC 104 correlates the setting for the printing process condition received through this screen with image data to be printed, and controls to transmit the correlated setting as one job including a printing executing request to the printing system 1000 through the network 101.

In this case, in the printing system 1000, when receiving this printing execution request included in the job through the external I/F 202, the controlling unit 205 controls the printing system 1000 to process this job from the PC 104 based on this printing process condition from the PC 104.

Next, a variety of controls executed by the controlling unit 205 according to the present embodiment for the printing system 1000 will be described below.

Meanwhile, the printing system 1000 is provided with the printer 100 including the printing unit 203 which can execute the printing process for data of the HDD 209 which can store data of a plurality of jobs. The printing system 1000 is configured so that the printer 100 can be connected to a plurality of the sheet-processing apparatuses 200. Each of a plurality of the sheet-processing apparatuses 200 connectable to the printer 100 is configured so as to be able to execute the sheet-processing (also referred to as finishing or post-processing) for the sheet (also referred to as printed matter or printed medium) of the job, having been printed by the printing unit 203.

The sheet-processing apparatuses 200 are configured so that the operator can pick up the printed matter sheet-processed by each sheet-processing apparatus itself. In addition, the sheet-processing apparatuses 200 are configured so that the sheet set in a paper-feeding deck of the large-capacity inserter 200-3*d* can be selectively delivered from the large-capacity inserter 200-3*d*, which is one of the sheet-processing apparatuses 200, to a plurality of the sheet-processing apparatuses 200. The printing system 1000 of the present embodiment is configured so that the sheet of the job, having been printed by the printing unit 203, can be selectively delivered from the printing unit 203 to a plurality of the sheet-processing apparatuses 200.

The printing system 1000 includes such a function that the job is processed by using only the sheet-processing apparatus 200, but not by using the printer 100. The controlling unit 205 controls the printing system 1000 to be able to selectively execute the process by using only this sheet-processing apparatus 200 and the process by using this sheet-processing apparatus 200 and also the printer 100 based on the operator instruction from the user interface unit (UI unit) for each job to be processed. The controlling unit 205 can also control the printing system 1000 so as to be able to execute the above two processes which are combined in some cases.

The printing system 1000 of the present embodiment is configured to be rich of the flexibility and/or the convenience so that by receiving an execution request for a specific type of job which does not execute the printing by a printing unit, but execute the post-processing by a post-processing unit connected to the printing unit, the post-processing by the post-processing unit connected to the printing unit can be executed without printing by the printing unit.

Specifically, in the present embodiment, the printing unit 203 and/or the printer 100 functions as the printing unit, and the sheet-processing apparatus 200 (for example, at least any finisher of FIG. 4 to FIG. 6) connected to this printer 100 functions as the post-processing unit.

In the present embodiment, as described above, the job is received as this specific type of job, which does not need the printing by the printing unit 203, but needs the sheet-processing (hereinafter, referred to as post-processing) by the sheet-processing apparatus 200. For example, the job corresponds to this specific type of job, which executes the post-processing by the sheet-processing apparatus 200 without printing by the printer 100.

As described above, in the present embodiment, the job is treated as the specific type of job, which needs the post-processing to be execute by the sheet-processing apparatus 200 independently (asynchronously/not-interlockedly) of the printing process by the printer 100. The controlling unit 205 controls the printing system 1000 to process the specific type of job.

Meanwhile, the post-processing, which is permitted to be executed by this specific type of job in the present embodiment, is as follows:

(1) Stapling process;
(2) Punching process;
(3) Cutting process;
(4) Saddle stitching book-binding process;
(5) Folding process;
(6) Casing-in book-binding process;
(7) Top gluing book-binding process; and
(8) Inserting process.

In the present embodiment, the post-processing (1) to (5) are configured so as to be able to be selectively executed by the saddle stitching book-binding apparatus 200-3*c* of FIG. 5. The post-processing (6) and (7) are configured so as to be able to be selectively executed by the gluing book-binding apparatus 200-3*b* of FIG. 4. The post-processing (8) is configured so as to be able to be executed by the large-capacity inserter 200-3*d* of FIG. 8.

In the present embodiment, as described later in FIG. 13, the controlling unit 205 controls so as to display a plurality of selection candidates by the user interface for the post-processing which is permitted to be executed without printing by the printer 100.

The post-processing which can be executed without printing is not limited to the above post-processing. It is not necessary that a plurality of types of the post-processing are configured to be able to be selectively executed as in the present embodiment, and the configuration is not limited to the above configuration. For example, the present invention also includes the configuration, in which the number of the types of the post-processing is only one.

In the present embodiment, a variety of the user interfaces function as a unit for receiving the aforementioned execution request, which are the user interfaces provided by the printing system 1000, and are configured to be able to interactively respond to an operation by the operator. For example, as the user interfaces can be exemplified the operation unit 204, a soft key and a hard key included in the operation unit 204, and/or a variety of user interface screens illustrated in the figures. Meanwhile, the above user interfaces are exemplified ones, and the user interfaces are not limited to the above user interfaces.

For example, the printing system 1000 may be configured so that the execution request for the above specific type of job is also received from the external apparatus other than the printing system 1000. In this case, for example, the user interface can function as this execution request receiving unit, which is included in an external data generating source such as the network scanner 102, the PC 103, and the PC 104. In this case, a unit such as the external I/F 202 can also function as this execution request receiving unit, which is necessary for the printing system 1000 to receive the specific type of job from outside. As described above, a variety of modifications can be applied in the present embodiment, and any configuration can be applied, in which the following control can be executed in the printing system 1000 of the present embodiment.

Specifically, in the printing system 1000, when the controlling unit 205 receives the execution request for the above specific type of job through the above user interface, in response to this execution request, the controlling unit 205 does not execute the printing by the printer 100, but controls the sheet-processing apparatus 200 to execute the post-processing for the printed matter (first printed matter) previously generated for the specific type of job.

As described above, the printing system 1000 includes the following unit. The printing system 1000 includes a first controlling unit which, when receiving the execution request for the specific type of job, does not execute the printing by the printing unit but causes the above post-processing unit to execute the post-processing for the first printed matter previously generated for the job. In the present embodiment, the controlling unit 205 functions as this first controlling unit.

Meanwhile, in the present embodiment, the sheet-processing apparatus 200 itself includes a predetermined delivering unit which is configured to be able to deliver a plurality of the printed media (printed matter) which are previously printed as this first printed matter. In the present embodiment, as the sheet-processing apparatus 200, the large-capacity stacker 200-3*a* of FIG. 4, the saddle stitching book-binding apparatus 200-3*c* of FIG. 5, and the large-capacity inserter 200-3*d* of FIG. 8 are provided with a inserter, and paper-feeding decks 1 to 3, and the like respectively. In the present embodiment, the above units not only complete the above-described function, but also function as the predetermined delivering unit. The operator sets the first printed matter, which is necessary for the above specific type of job, to this predetermined delivering unit.

In the present embodiment, when the operator instructs the execution request for this specific type of job, the controlling unit 205 controls to deliver this first printed matter from the delivering unit to the post-processing unit inside the sheet-processing apparatus 200 not through the above printing unit. After that, the controlling unit 205 causes the post-processing unit to execute the post-processing for the first printed matter. By such a method, the controlling unit 205 causes the sheet-processing apparatus 200 to be able to execute the post-processing instructed by the user for the job without printing by the printer 100.

Meanwhile, the printing system 1000 may be configured so that, when the above specific type of job is executed, the above first printed matter utilized for the job is delivered from a paper-delivering cassette which is the predetermined delivering unit included in the printer 100. In this case, while the first printed matter is introduced to inside of the sheet-processing apparatus 200 through a transporting path inside the printer 100, in this case, the controlling unit 205 controls the printer 100 not to print the first printed matter. When this printed matter is introduced to the above sheet-processing apparatus 200, the controlling unit 205 controls so that the post-processing instructed by the user is applied to the printed matter. The printing system 1000 may be configured as described above.

As described above, the printing system 1000 of the present embodiment is configured so that the controlling unit 205 controls the sheet-processing apparatus 200 to be able to execute the post-processing for the specific type of job without printing by the printer 100, and is also provided with the following configuration.

For example, the printing system 1000 of the present embodiment is provided with a print data receiving unit (printed data obtaining unit) adapted to receive (obtain) the print data utilized for generating the above first printed matter.

In the present embodiment, the user interface such as the operation unit 204 and the after-mentioned predetermined operation screen functions as the printed data receiving unit. Specifically, the user interface provided in the present embodiment is configured so that the user can designate an obtaining source (obtaining destination).

In an after-mentioned example, the printing system 1000 is configured so that the print data utilized for generating this first printed matter can be obtained from the external apparatus other than the printer 100, and in such a case, the print data is obtained through the external I/F 202. As described above, in the present embodiment, the external I/F 202 also functions as the printing data receiving unit.

The printing system 1000 of the present embodiment includes a second controlling unit which causes the printing unit to anew generate a second printed matter corresponding to the first printed matter, that is, whose format is the same as or different from that of the first printed matter, by using the corresponding print data received (obtained) by the print data receiving unit. In the present embodiment, such a configuration is exemplified that the above controlling unit 205 functions as this second controlling unit.

For example, the controlling unit 205 controls the printing unit 203 to execute the printing process, in which the same print data is used as the print data printed to a print medium corresponding to the above first printed matter, for the print medium corresponding to the second printed matter. In such a method, the controlling unit 205 causes the printer 100 to generate the second printed matter.

Meanwhile, in the present embodiment, the controlling unit 205 controls the printer 100 to print the above print data on the print medium corresponding to the above second printed matter on the same condition as the printing condition when the first printed matter is generated. Thereby, the printer 100 can generate, as a second printed matter, the same printed matter, whose format is the same as that of the above first printed matter. While the printing condition described here corresponds to processing conditions described below and the like, the above conditions are just exemplifications, and the condition is not limited to the above exemplified processing conditions.

(1) The processing condition for a size and/or a type of the print medium utilized for generating the second printed matter.

(2) The processing condition for a printing magnification (variable magnification) when the above print data is printed on this print medium.

(3) The processing condition for a print position and/or a direction of the print (printing direction) when the above print data is printed on this print medium.

(4) The processing condition for a print layout such as an expansion layout and a reduction layout, and single side printing/both sides printing when the above print data is printed on this print medium.

In the present embodiment, the controlling unit 205 controls the printer 100 to change a part of the processing condition from the printing condition when the first printed matter is generated to print the above print data on the print medium corresponding to the above second printed matter. By such a method, the controlling unit 205 controls the printer 100 to be able to generate, as the second printed matter, the printed matter whose format is at least partially different from that of the above first printed matter.

As described above, in the present embodiment, the controlling unit 205 controls the printer 100 (printing unit 203) to execute the printing process, in which the print data utilized for generating the first printed matter is utilized again. The controlling unit 205 can cause the printer 100, as the second printed matter obtained by this printing process, to generate the printed matter whose format is the same as that of the first printed matter, and to generate the printed matter whose format is at least partially different from that of the first printed matter.

Meanwhile, it is not necessary that, like the printing system 1000 of the present embodiment, the configuration corresponds to both of a configuration in which the second printed matter is generated whose format is the same as that of the first printed matter, and a configuration in which the second printed matter is generated whose format is different from that of the first printed matter. For example, the present invention also includes a configuration corresponding to only any one of the above configurations.

In an after-mentioned example, the configuration is exemplified in which the printer 100 obtains the print data utilized when the first printed matter is generated from an external apparatus through a network. In addition, such a case is exemplified that this external apparatus corresponds to another printer (the printer of the printing system 1001 in FIG. 1), which is different from the printer 100, and the information processing apparatus such as the computers 103 and 104. However, the configuration may be also a configuration other than this example, and is not limited to this example.

For example, the printing system 1000 may be configured so that the printer 100 includes a wireless communicating function, and the controlling unit 205 controls the printer 100 to obtain the print data utilized when the above first printed matter is generated from a portable information terminal such as a portable phone. Alternately, the printing system 1000 may be also configured so that the printer 100 is provided with a setting unit adapted to set a predetermined storing medium which is removable for the printer 100 such as a removable medium, and a writing reading unit adapted to write and read data to and from the storing medium, and the controlling unit 205 controls the printer 100 to obtain the print data utilized when the above first printed matter is generated from this storing medium and to generate the above second printed matter by using the obtained print data.

The printing system 1000 may be also configured so that, when the apparatus which generates the first printed matter is the printer 100 itself, the controlling unit 205 stores the print data utilized when the first printed matter is generated in the HDD 209, obtains the print data from the HDD 209, and controls the printer 100 to generate the second printed matter by using the print data. As described above, the printing system 1000 is configured so as to be able to correspond to a variety of configurations.

As described above, the printing system 1000 of the present embodiment can provide a system in which the post-processing by the post-processing unit connected to the printing unit can be utilized without printing by the printing unit, and which is rich of the flexibility, the convenience, and/or the productivity. For example, particularly, as described above, the printing system 1000 itself can quickly deal with such a need that it is desired to recover an error as to the job (finishing only job) which does not need the printing by the printing system 1000, but needs only the finishing. For example, for the finishing only job in which the processing is safely completed with no error the printing system 1000 itself can quickly deal with a need such as the refinishing for generating the same result as that of the finishing only job.

As described above, the printing system 1000 itself can be provided with a system in which not only the finishing only job is supported but also a recovering function or a refinishing function is realized even for the specific job. The printing system 1000 of the present embodiment is also further provided with the following configuration as a system in which the advantage can be further improved.

For example, the controlling unit 205, which also functions as the above second controlling unit, controls a timing for obtaining the above print data so that the printer 100 can quickly and securely generate the second printed matter at a necessary time interlocking with the control for generating the above first printed matter.

Specifically, in the present embodiment, the controlling unit 205 controls the print data receiving unit to previously obtain the above print data without waiting for the error induced in the post-processing applied to the above first printed matter, and/or the receiving of a generation request for the above second printed matter. Thereby, the controlling unit 205 controls the printer 100 to previously wait for starting generating the above second printed matter for such a case that the post-processing for the first printed matter fails, or the generation request for the second printed matter is induced.

A configuration is exemplified as an example of this configuration in an after-mentioned example that the controlling unit 205 controls to obtain the above print data at a timing before the sheet-processing apparatus 200 actually starts the post-processing for the first printed matter which is necessary for the above specific type of job.

In the present embodiment, more specifically, the controlling unit 205 controls as follows. Before receiving the execution request for the above specific type of job through the above user interface from the user, the controlling unit 205 controls to cause the user to set the post-processing condition which is necessary for the job in the user interface. By utilizing a timing when the user executes a series of settings for this post-processing condition in the user interface, in the early stage of the series of settings, the controlling unit 205 causes the user to input information on a location (obtaining destination) of the above print data in the user interface.

The controlling unit 205 specifies a storing location of the print data based on this inputted information, and controls the external I/F 202 to access the storing location, which functions as the above print data receiving unit. In the present embodiment, by the above method, while the user is setting a series of the processing conditions for the post-processing of the specific type of job, the controlling unit 205 controls to complete a work for obtaining the above print data in parallel.

As described above, according to the configuration of the present embodiment, the controlling unit 205 can control the printing system 1000 so that the printer 100 is previously ready to generate the second printed matter when the printing system 1000 starts the above specific type of job. Thereby, for example, before a request is actually induced, such as a request for re-executing the post-processing for the first printed matter since the first printed matter is jammed while the post-processing is being executed, and a request of the user, which has seen the result of the post-processing, for additionally print this printed matter, it is possible to complete the advance preparation for the requests. Thus, the controlling unit 205 can cause the printer 100 to immediately generate the second printed matter when the requests are issued. Meanwhile, an after-mentioned example is an exemplified one, and the configuration is not necessarily limited thereto.

In the present embodiment, the printing system 1000 is further provided with the following configuration as a system for further improving the above advantage.

For example, the printing system 1000 of the present embodiment further includes a managing unit adapted to treat the job for causing the printer 100 to generate the above second printed matter not as the above specific type of job, but as a non-specific type of job. In the present embodiment, a configuration will be exemplified in which the controlling unit 205, which functions as the above first and second controlling units, also functions as this managing unit. In the present embodiment, as described above, the controlling unit 205 controls so that the printing system 1000 can execute the following process by managing the corresponding job as the non-specific type of job.

For example, the controlling unit 205 controls the above user interface to display information on this non-specific type of job in response to the request from the user in a display form in which the non-specific type of job can be distinguished from the specific type of job.

An example of this information corresponds to information on a obtaining destination from which the above print data is obtained, information on the processing condition on which the printer 100 generates the second printed matter by using this print data, and the like. The example of the corresponding information also corresponds to information indicating a current progress condition and the status of the non-specific type of job, in which it is necessary to generate the second printed matter, in the printer 100.

As described above, by managing the job as the non-specific type of job without treating the job as the specific type of job, in which it is necessary to generate the second printed matter, such a advantage is obtained that a variety of the above processing can be executed by the present invention. The following configuration can be also applied to the present invention.

For example, the printing system 1000 of the present embodiment is configured so that, even while executing the process for a printing job, the printing execution request for other jobs than the print job is not rejected, and can be always received, and the print data of a new job can be always stored in the HDD 209. Each of the jobs is entered to a print queue managing a processing order for each job so that a plurality of jobs, in which the printing execution request has been executed, are sequentially and continuously processed.

As described above, in the present embodiment, by managing the non-specific type of job, the non-specific type of job can be entered to the printing queue like other printing job. Thereby, the printing system 1000 can process the job, in which it is necessary to generate the above second printed matter, in a correct order without interrupting the processing by other printing job.

As described above, in the present embodiment, since the controlling unit 205 functions as the above managing unit, a variety of advantages are obtained, and the above advantages can be further improved.

Meanwhile, the above configurations are exemplified ones, and the configuration is not limited thereto. The printing system 1000 of the present embodiment further includes the following system as a system for further improving the above advantage.

For example, in the present embodiment, as described above, when executing the above specific type of job, the controlling unit 205 controls the sheet-processing apparatus 200 to execute the post-processing for the first printed matter previously provided for this job without printing by the printer 100.

On other hand, when executing the above non-specific type of job in which it is necessary to reutilize the print data previously printed on this first printed matter, the controlling unit 205 executes the control which is distinguished from the control executed when the above specific type of job is executed.

For example, when executing the non-specific type of job, the controlling unit 205 controls the sheet-processing apparatus 200 to be able to execute the post-processing interlocking with printing by the printer 100 (while printing).

As described above, in the present embodiment, when executing the specific type of job, the controlling unit 205 prohibits the sheet-processing apparatus 200 to execute the post-processing along with printing by the printer 100. On other hand, when executing the non-specific type of job, the controlling unit 205 permits the sheet-processing apparatus 200 to execute the post-processing along with printing by the printer 100.

As described above, when executing the non-specific type of job, that is, when generating the second printed matter, the controlling unit 205 controls so that the printing by the printer 100 and the post-processing by the sheet-processing apparatus 200 can be sequentially executed.

In the present embodiment, by the above configuration, the controlling unit 205 causes the printer 100 to execute the printing for generating the second printed matter, and after that, the controlling unit 205 controls the sheet-processing apparatus 200 to be able to execute the post-processing for the second printed matter.

And also, in the present embodiment, as described above, when generating the second printed matter, the controlling unit 205 controls to cause the sheet-processing apparatus 200 to execute the post-processing, whose type is the same as or different from that of the post-processing executed for the above first printed matter, for the second printed matter.

Thereby, the following advantage can be obtained. For example, such an advantage can be obtained that the printing system 1000 can deal with both of a configuration in which the post-processing (in an after-mentioned example, the casing-in book-binding process), whose type is the same as that of the first printed matter, is applied to the second printed matter in which the print result, which is the same as that of the first printed matter, is printed, and a configuration in which the post-processing, whose type is different from that of the first printed matter, is applied to the second printed matter.

Meanwhile, while the printing system 1000 of the present embodiment is provided with the configuration which deals with both of the configurations, this configuration is an exemplified one, and the configuration is not necessarily limited thereto. For example, the printing system 1000 of the present embodiment may be provided with the configuration which deals with only any one of the configurations, or the configuration in which the post-processing itself is not originally executed when the second printed matter is generated. As described above, while a variety of forms are included in the present invention, the printing system 1000 of the present embodiment also includes the following system to improve the above advantages.

For example, in the present embodiment, the controlling unit 205, which functions as the first and second controlling units, also controls the operation condition for a trigger which permits the printer 100 to generate the second printed matter.

An example of this trigger includes information indicating that while the sheet-processing apparatus 200 is executing the post-processing which is necessary for the above the first printed matter, a trouble related to the first printed matter is induced in the sheet-processing apparatus 200. Specifically, under the condition that the controlling unit 205 receives information indicating the induced trouble from the sheet-processing apparatus 200 through an internal signal line, the controlling unit 205 permits the printer 100 to generate the above second printed matter.

Meanwhile, when a jam, or the like of the first printed matter is induced as this trouble, the controlling unit 205 waits for the first printed matter remaining in the apparatus to be eliminated by the user from the sheet-processing apparatus 200. After resolving the jam trouble, the controlling unit 205 controls the printer 100 to start generating the second printed matter. In this case, even if the user does not clearly input an instruction for generating the second printed matter through the user interface, the controlling unit 205 controls so that the second printed matter is automatically generated with the determination by the controlling unit 205. However, the configurations are also exemplified ones, and the printing system 1000 of the present embodiment may be configured so that the controlling unit 205 controls so that the second printed matter is generated even in such a case under the condition that such an instruction is received from the user.

In the present embodiment, as an example which is different from the above example, after the sheet-processing apparatus 200 executes the post-processing which is necessary for the above first printed matter, the controlling unit 205 controls so that the generation request for the above second printed matter can be received from the user through the above user interface. In response that this generation request is received, under the condition of such a fact, the controlling unit 205 permits the printer 100 to generate the above second printed matter. In response that the generation request for the second printed matter is received from the user by such a method, the controlling unit 205 controls the printer 100 to be able to generate the second printed matter.

The printing system 1000 of the present embodiment is also provided with a system, in which the above print data is not uselessly continued to be held, so that the above advantage can be improved.

For example, the printing system 1000 of the present embodiment is further provided with a unit adapted to discard (delete) the print data at a correct timing, which is utilized to generate the first printed matter received by the above method by the above print data receiving unit. In the present embodiment, the above controlling unit 205 functions as this unit, and thereby, the processing indicated in the following example can be executed.

First, the controlling unit 205 controls the print data receiving unit to obtain the print data utilized when the first printed matter is generated by any of the above methods, and controls a predetermined storing unit such as the HDD 209 to store the obtained printed data. Thereby, the controlling unit 205 provides for generating the second printed matter. The above description indicates a configuration in which the controlling unit 205 causes the printer 100 to wait for starting the generation of the second printed matter.

In this example, after it is completed to prepare to generate this second printed matter, the controlling unit 205 executes a predetermined determination whether or not the above print data is discarded.

Specifically, the controlling unit 205 determines whether or not the post-processing, which is necessary for the first printed matter, is completed in the sheet-processing apparatus 200 without inducing the trouble related to the above first printed matter. When an YES determination is made in this determination, which means that it is completed to execute the post-processing, which is necessary for the first printed matter, without inducing the trouble, the controlling unit 205 controls so that the print data of the first printed matter is discarded (deleted) from the HDD 209.

On the other hand, when an error of the first printed matter such as a jam is induced during the post-processing, a NO determination is made in this determination. In this case, the controlling unit 205 controls so that the print data is not discarded (deleted) from the HDD 209, and is continuously held. As described above, the controlling unit 205 controls to provide for such a case that the printer 100 generates the second printed matter to compensate the failure of the post-processing for the first printed matter.

The printing system 1000 of the present embodiment further includes a system illustrated in the following example.

For example, as described above, it is assumed that, after it is completed to prepare to generate the second printed matter, the post-processing, which is necessary for the first printed matter, is completed by the sheet-processing apparatus 200 without any trouble. From the time point when the post-processing is completed, the controlling unit 205 starts determining whether or not the generation request for the second printed matter is inputted through the above user interface.

It is assumed that, until a predetermined time is passed over from this completion time point, the generation request for the second printed matter is not received through the user interface. In this case, under the condition of this assumption, the controlling unit 205 controls so that the above printed matter is discarded (deleted) from the HDD 209.

On the other hand, it is assumed that, until a predetermined time is passed over from this completion time point, the generation request for the second printed matter is received through the user interface. In this case, in response to receiving the request, the controlling unit 205 controls to cause the printer 100 to start generating the second printed matter by using the above print data.

Since the printing system 1000 is configured as in the above two examples, a variety of use cases can be flexibly dealt with. An example of this use case is such a case that the user, which confirms that the satisfactory post-processing is applied to the first printed matter, requests to additionally print the same one as the first printed matter. Such a case is also the example that the user needs to generate the printed matter again since it is necessary to execute other post-processing thereto.

The printing system 1000 of the present embodiment controls so that the print data is not discarded (deleted) from the HDD 209, but is continuously held in order to be able to respond to the request. On the other hand, the printing system 1000 of the present embodiment is provided with the above system so that the trouble is not induced that the data is uselessly stored without the request.

Meanwhile, in the present embodiment, while the printing system 1000 includes both of the configurations corresponding to the two examples, the configurations are also exemplified ones, and the configuration is not limited thereto. For example, the present invention also includes the printing system provided with the configuration corresponding to any one of the examples, or the printing system not provided with any one of the above configurations. In the present embodiment, the printing system 1000 is also provided with the following system so that the above advantage can be further improved.

For example, in the present embodiment, when receiving the execution request for the above specific type of job which needs the post-processing for the first printed matter, the controlling unit 205 controls so that a predetermined instruction can be received from the user through the user interface. This predetermined instruction corresponds to an instruction (obtaining instruction) for causing the above print data receiving unit to obtain the above print data.

In the after-mentioned example, a configuration is exemplified in addition to this instruction, in which the controlling unit 205 controls so that information (obtaining destination specifying information) for designating an obtaining destination of this print data can be received from the user through the above user interface.

In this configuration, the controlling unit 205 functions as a determining unit adapted to execute a predetermined determination. As this predetermined determination, the controlling unit 205 determines whether or not the above obtaining instruction and/or the above obtaining destination specifying information are inputted through the user interface when receiving the execution request for the specific type of job.

When it is determined from a result of this determination that the obtaining instruction and/or the obtaining destination specifying information are not inputted, the controlling unit 205 controls the printer 100 not to generate the above second printed matter (determination for the generation possibility). In this case, the controlling unit 205 may also control the above print data receiving unit to cancel the acquisition of the above print data itself.

On the other hand, when it is determined that the above obtaining instruction and/or the above obtaining destination specifying information are inputted, the controlling unit 205 controls the printer 100 to be able to generate the above second printed matter (determination for the generation possibility). In this case, the controlling unit 205 controls to save the above print data by the above method at least without waiting for the generating of the first printed matter to be completed, and to provide for the generating of the second printed matter.

Meanwhile, the printing system 1000 of the present embodiment is further provided with a system corresponding to an example other than this example.

For example, the printing system 1000 of the present embodiment is configured so that, when the print data is obtained, which is utilized when the first printed matter is generated by the above method, the print data can be held in the HDD 209 functioning as a storing unit which can be accessed by the printer 100.

In this configuration, the controlling unit 205 also functions as a determining unit adapted to determine whether or not there exists the print data in the HDD 209. When it is determined from a result of this determination that there does not exist the print data, the controlling unit 205 controls the printer 100 not to generate (to cancel) the second printed matter. As described above, in such a condition that the job is already entered as the non-specific type of job generating the second printed matter in the above print queue, according to a result of this determination, the controlling unit 205 controls so that this non-specific type of job is deleted from the queue.

On the other hand, when it is determined from a result of this determination that there exists the print data in the HDD 209, the controlling unit 205 controls the printer 100 to be able to generate the second printed matter. In this case, the controlling unit 205 controls so that the non-specific type of job generating the second printed matter is entered by the above method to the print queue like other printing job. The controlling unit 205 controls the printer 100 to be able to generate the second printed matter at a correct timing without carelessly providing other printing job with any influence.

Meanwhile, while the printing system 1000 of the present embodiment includes both of the configurations corresponding to the two examples, the above configurations are also exemplified ones, and the configuration is not limited thereto. For example, the present invention also includes the printing system provided with the configuration corresponding to any one of the examples, or the printing system not provided with any one of the above configurations.

As described above, the printing system 1000 of the present embodiment is configured so that the post-processing by the post-processing unit connected to the printing unit can be executed without printing by the printing unit. The printing system 1000 of the present embodiment is provided with the configuration in which a variety of controls related to this configuration can be executed. However, like the printing system 1000 of the present embodiment, the printing system may be provided with all of the configurations, the printing system may be provided with any one of the configurations. For example, any configuration can be applied, in which at least one of the above advantages can be obtained.

In a variety of the above configurations or an after-mentioned example, a configuration may be adapted in which the controlling unit 205 provided in the printer 100 including the printing unit 203, as described above, functions as the first and second controlling units and a variety of determining units. However, the configuration is exemplified one, the internal configuration may be any type of configuration, and the configuration is not limited thereto.

For example, the printing system may be configured so that a variety of determinations and/or controls realized by the units described in the present embodiment are realized by a CPU provided in another device which can communicate data with the printer 100. For example, the PCs 103 and 104, the sheet-processing apparatus 200, the printing system 1001, and the like of FIG. 1 can be applied as the another device. As described above, the printing system 1000 of the present embodiment is configured so as to be able to be applied to a configuration in which all the unit or any unit such as the above first and second controlling units are provided in the different apparatus other than the printer 100.

Next, an example 1 and an example 2 will be sequentially described below as the examples of a variety of configurations and the controls for the configurations of the above present embodiment. Meanwhile, the configurations other than the configurations described in the following examples are absolutely the same as the above configurations, so that duplicate description regarding the above same configurations will be omitted.

While the following examples 1 and 2 exemplify a configuration in which the controlling unit 205 controls to cause the operation unit 204 to display a variety of illustrated user interface screens, the configuration is not limited thereto. For example, as described above, the same screens may be provided by the user interface of other device such as the PCs 103 and 104, and the printing system 1001.

The following examples 1 and 2 exemplify a configuration in which the controlling unit 205 reads a computer-executable program for executing the processing of a variety of flowcharts from a memory inside the printer 100 and executes the programs. Thereby, the below-described processing for a variety of flowcharts is executed. Meanwhile, while the following examples 1 and 2 exemplify the configuration, which is not limited thereto. For example, as described above, the printing system 1000 can be also applied to the configuration, in which the processing is executed by a CPU provided in the different apparatus other than the controlling unit 205.

Under the above description, the example 1 will be described below, which corresponds to the configuration provided in the above printing system 1000 of the present embodiment. Here, an example of a function processing a job by using only the sheet-processing apparatus 200, as the above specific type of job, will be described.

EXAMPLE 1

Figure 9A:
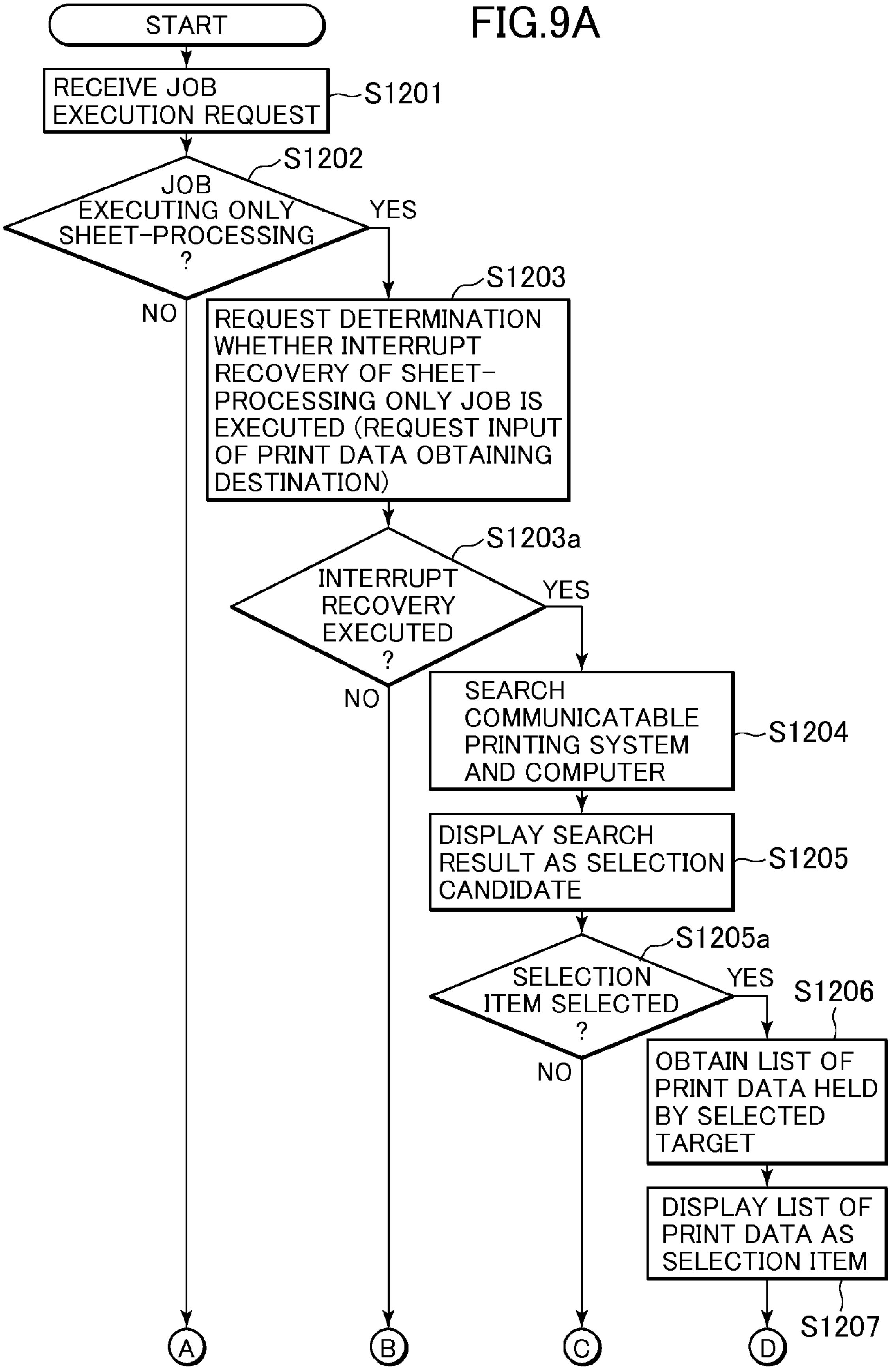
FIG. 9A is a flowchart showing a procedure of the post-processing executed by the printing system.
Figure 9B:
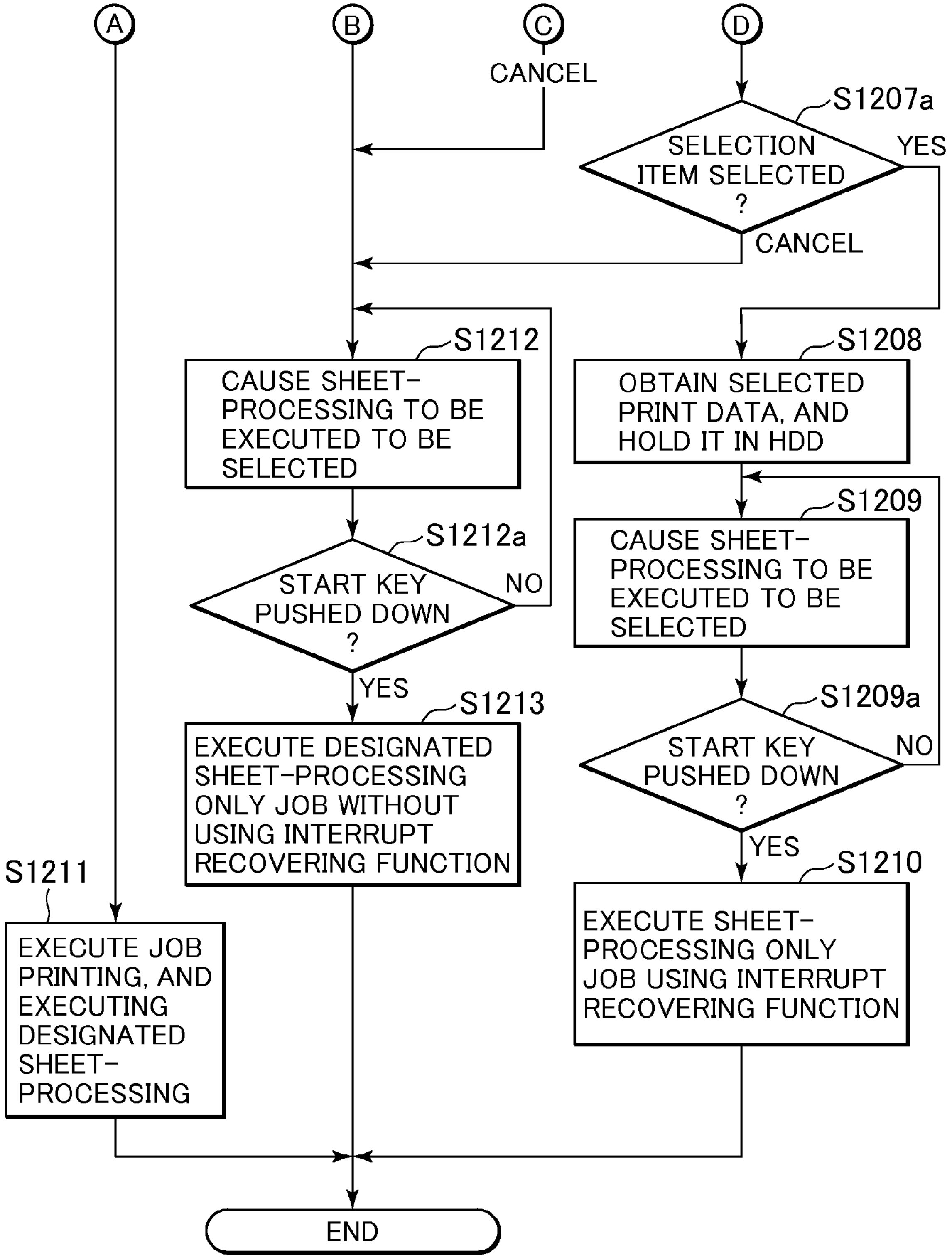
FIG. 9B is a flowchart continued from the flowchart in FIG. 9A.

FIG. 9A and FIG. 9B are flowcharts showing a procedure of the post-processing executed by the printing system 1000. In the present example, the job (corresponding to the above specific type of job) is processed by using only the sheet-processing apparatus 200. First, in the touch panel unit 401 of the operation unit 204 provided in the printing system 1000, the execution request for the job is received from the operator (step S1201).

Specifically, when the sheet-processing setting key 609 illustrated in FIG. 6 on a screen displayed on the touch panel unit 401 is pushed by the operator, the controlling unit 205 causes the touch panel unit 401 to display the setting screen of FIG. 7. When a manual setting button 713 provided in the setting screen of FIG. 7 is pushed, the controlling unit 205 determines that the execution request for the processing by using only the sheet-processing apparatus 200 is executed (YES at step S1202), and the process proceeds to the process of step S1203.

Figure 10:
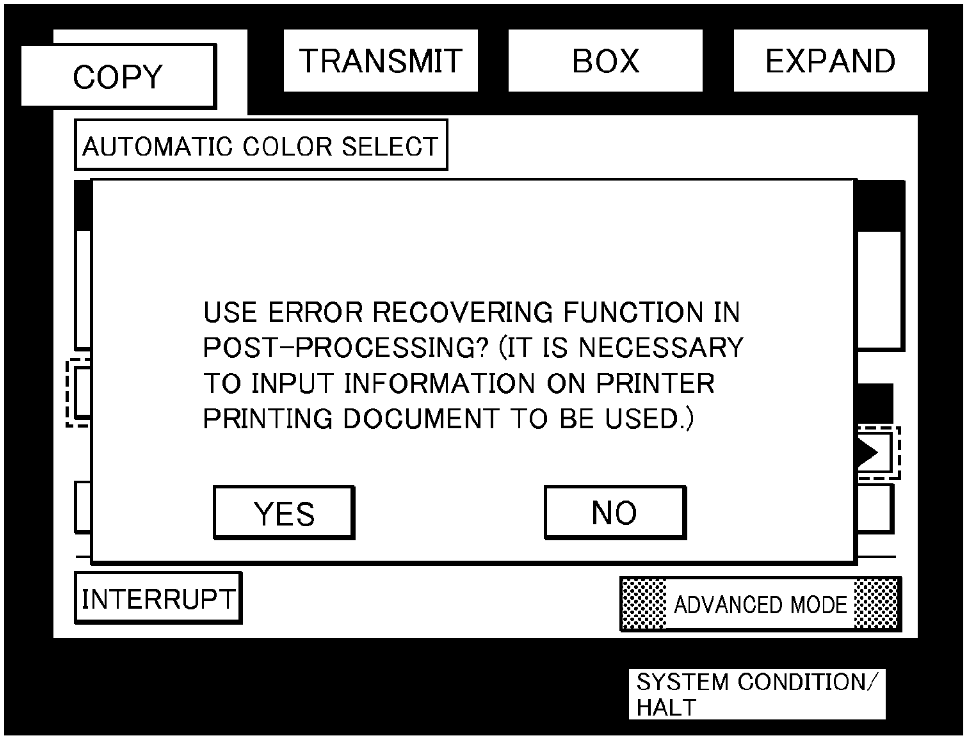
FIG. 10 is a diagram illustrating one of the setting screens.

At step S1203, the controlling unit 205 displays the setting screen of FIG. 10 on the touch panel unit 401, and causes the operator to select whether or not to execute the job processing while being conscious of recovering an error when any processing interrupting event (jam, or the like) is induced (step S1203). In this case, as illustrated in the setting screen of FIG. 10, the controlling unit 205 informs, in parallel, the operator of a fact that information on the printer printing the sheet to be processed is necessary for the selecting, and the process proceeds to the process of step S1203*a*.

When the start key 503 is pushed without manual setting button 713 pushed, at step S1202, the controlling unit 205 determines that the execution request does not corresponds to the job executing only the sheet-processing, and as described above, according to the print setting instructed through the operation unit 204 provided in the printer 100, the controlling unit 205 controls the printing unit 203 to print. The controlling unit 205 controls the printing system 1000 so that the desired sheet-processing is executed by the sheet-processing apparatus 200 connected in the downstream (step S1211).

On the other hand, when the operator selects to execute the job processing while being conscious of the error recovery, the controlling unit 205 determines to recover the job being interrupted (YES at step S1203*a*), and executes the following process. Through the external I/F 202 and the network 101, the controlling unit 205 searches the printing system 1001, the server computer 103 (PC 103), or the client computer 104 (PC 104) which can communicate with the controlling unit 205 (step S1204). The controlling unit 205 displays a list of the searched printing system or the like on the touch panel unit 401 by using the setting screen as illustrated in FIG. 11, indicates them as selection candidates to the operator (step S1205), and determines whether or not one of the selection candidates is selected by the operator (step S1205*a*).

Figure 11:
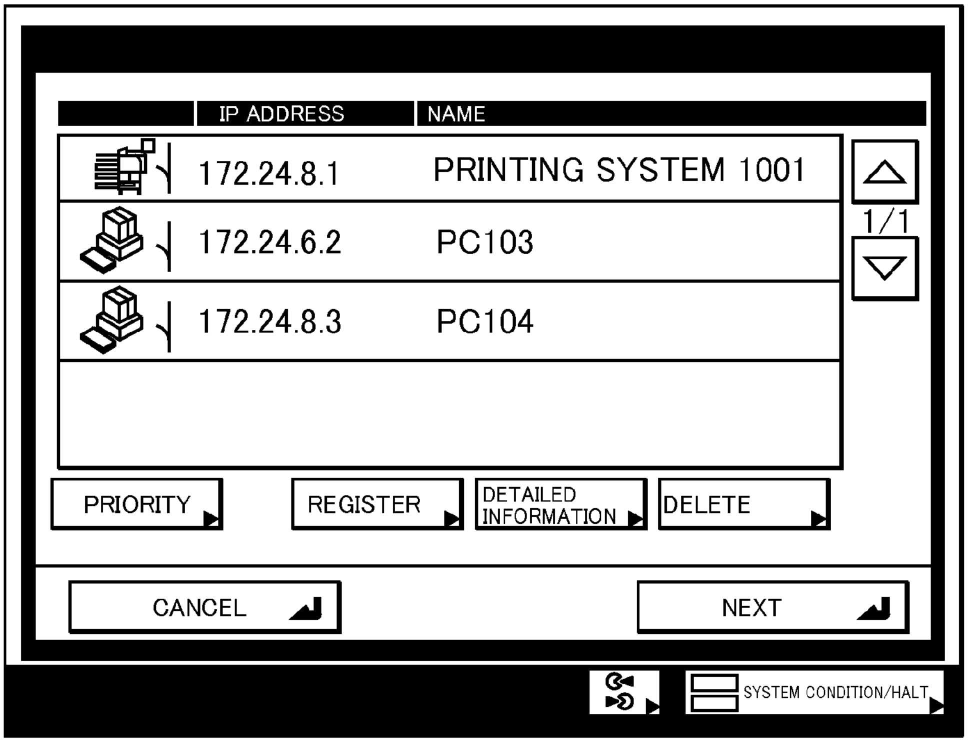
FIG. 11 is a diagram illustrating one of the setting screens.
Figure 12:
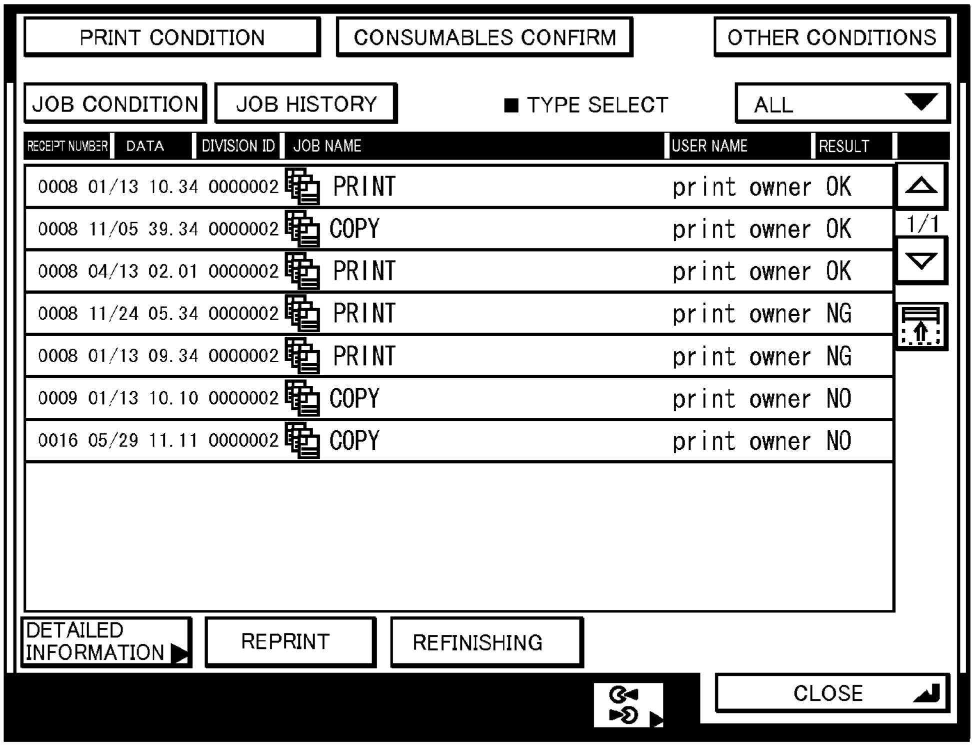
FIG. 12 is a diagram illustrating one of the setting screens.

Next, when one apparatus is selected by the operator from the printing system 1001, the server computer 103, and the client computer 104 which are displayed as the selection candidates in FIG. 11 (YES at step S1205*a*), the controlling unit 205 obtains, through the external I/F 202 and the network 101, obtains a list of the print data from the selected apparatus (step S1206). The controlling unit 205 displays the setting screen as illustrated in FIG. 12 on the touch panel unit 401, and causes the operator to select the print data (step S1207), and the process proceeds to the process of step S1207*a*. When the operator does not select one of the apparatus from the displayed selection candidates or one of the displayed print data (NO at step S1205*a*, or NO at step S1207*a*), the controlling unit 205 displays the setting screen of FIG. 13 on the touch panel unit 401, and causes the operator to select the sheet-processing to be executed (step S1212).

Figure 13:
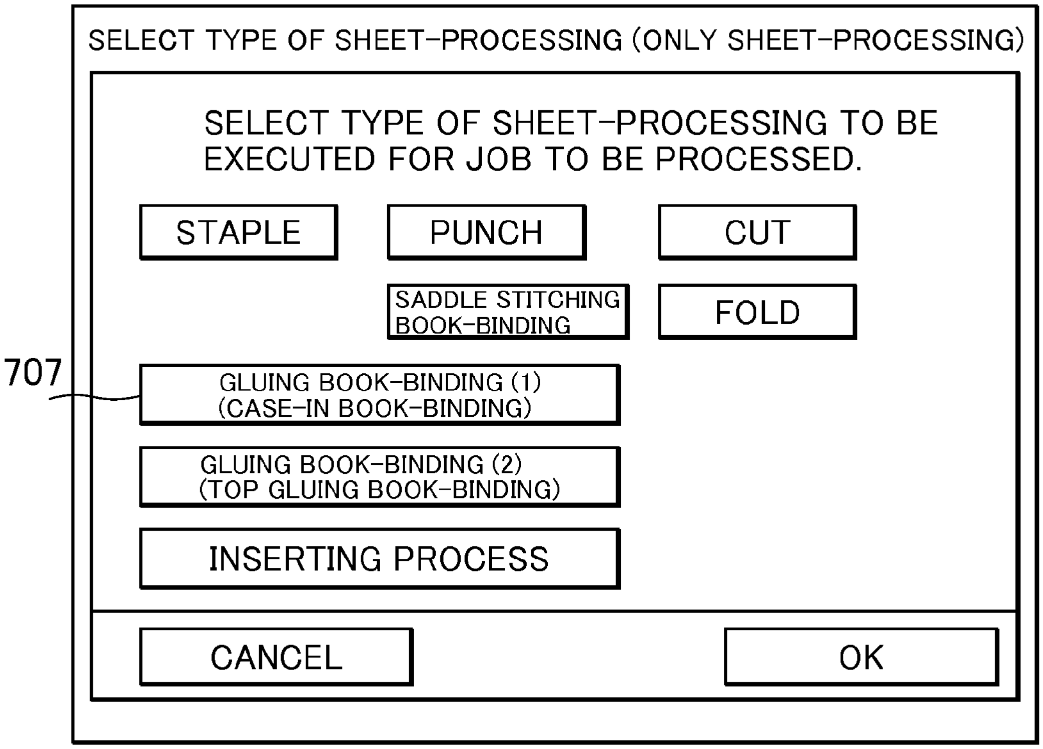
FIG. 13 is a diagram illustrating one of the setting screens.

The setting screen of FIG. 13 is a screen in which the items to be displayed are thinned according to the type and the configuration of the sheet-processing apparatus 200 connected to the printer 100. For example, in the case where the above-mentioned printing system registered by the operator with the registering process, has the configuration in which the saddle stitching book-binding apparatus 200-3*c* is not connected to the printer 100, the item of the saddle stitching book-binding is not displayed in the setting screen. The item of the sheet-processing is not also displayed, which can be processed only when a printing is operated in the printer 100. For example, the items of the following processes are not displayed; such as the above-mentioned process of discharging the sheets printed by the printer 100 to the above-mentioned large-capacity stacker 200-3*a*; and a process of discharging a large amount of sheets printed by the printer 100 using two not-illustrated large-capacity stackers while switching the discharging destination therebetween.

At step S1212, the operator selects, by using the screen of FIG. 13, the sheet-processing (post-processing) necessary for the above job (specific type of job executing the sheet-processing without printing), and thereafter, when the operator pushes down the start key 503 provided in the operation unit 204 (YES at step S1212*a*), the controlling unit 205 starts executing the designated sheet-processing only job while determining not to recover the job when the job is interrupted (step S1213).

According to the processes of step S1205*a* to step S1213, when there does not exist a target intended by the operator in the printing system 1001, the server computer 103, and the client computer 104 which are displayed as the selection candidate (step S1215), the process can proceed while skipping the selecting process. At step S1207, even when there does not exist the target intended by the operator in the list of the print data displayed as the selection candidate, the process can proceed while skipping the selecting process.

On the other hand, at step S1207, when one print data is selected by the operator from the list of the print data displayed as the selection candidate in FIG. 12 (YES at step S1207*a*), the controlling unit 205 executes the following processing. That is, the controlling unit 205 obtains the selected print data through the external I/F 202 and the network 101, and stores the obtained print data in the HDD (Hard disk drive) 209 (step S1208).

Next, the controlling unit 205 displays the screen of FIG. 13 to cause the operator to select the sheet-processing to be executed (step S1209), and when the start key 503 provided in the operation unit 204 is pushed down (YES at step S1209*a*), the controlling unit 205 executes the sheet-processing only job using an interrupt recovering function (step S1210). Here, it is not necessarily need for the sheet-processing selection by the operator at step S1209 to wait for the completion of a process for obtaining the print data and storing the print data in the HDD 209. This is because, since there exist a large size of the print data, it may take a long time to obtain the print data through the external I/F 202 and the network 101, and store the obtained print data in the HDD 209.

Because the sheet-processing apparatus has been multi-functioned in recent years, there exist a large number of items in the setting for the sheet-processing, so that a time has been also proportionately increased, which is spent by the operator to set the sheet processing at step S1209. Thus, it is possible to reduce the whole processing time that the process at step S1208 is executed in parallel while the operator is executing the sheet-processing setting at step S1209.

Figure 21A:
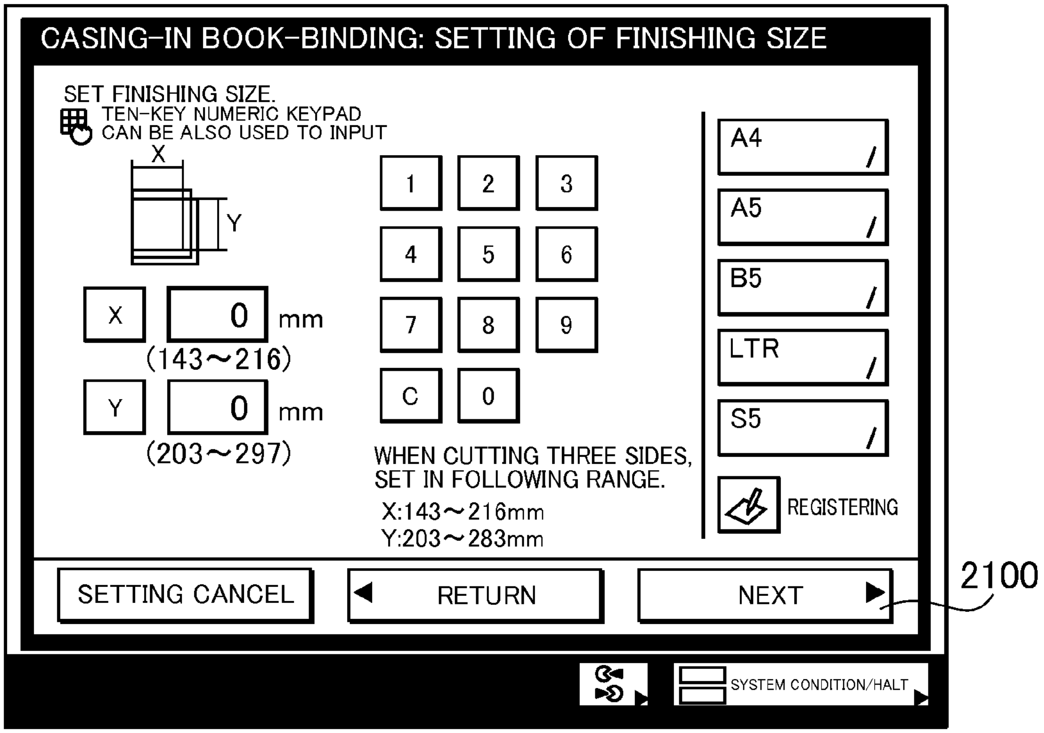
FIG. 21A is a diagram illustrating one of the setting screens.

For example, a method for reducing the whole processing time will be described by using the job executing the casing-in book-binding process by the above-mentioned gluing book-binding apparatus 200-3*b*. When the casing-in book-binding process is set to the job, first, the operator pushes down a button 707 of gluing bookbinding (1) (casing-in book-binding) in FIG. 13. Next, the controlling unit 205 displays the setting screen as illustrated in FIG. 21A on the touch panel unit 401, and prompts the operator to set a finishing size of the casing-in book-binding. Next, the operator inputs the finishing size in the setting screen of FIG. 21A, and thereafter, pushes down a "NEXT" button 2100, the controlling unit 205 displays the setting screen as illustrated in FIG. 21B on the touch panel unit 401.

Figure 21B:
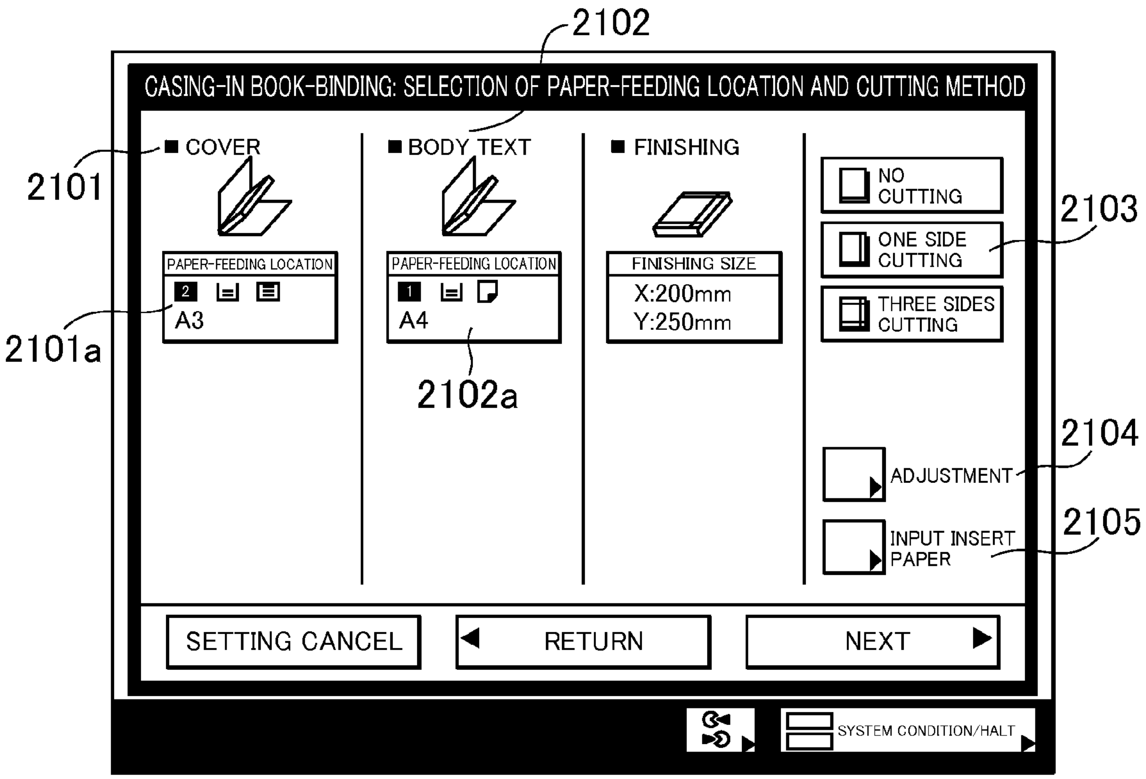
FIG. 21B is a diagram illustrating one of the setting screens.
Figure 21C:
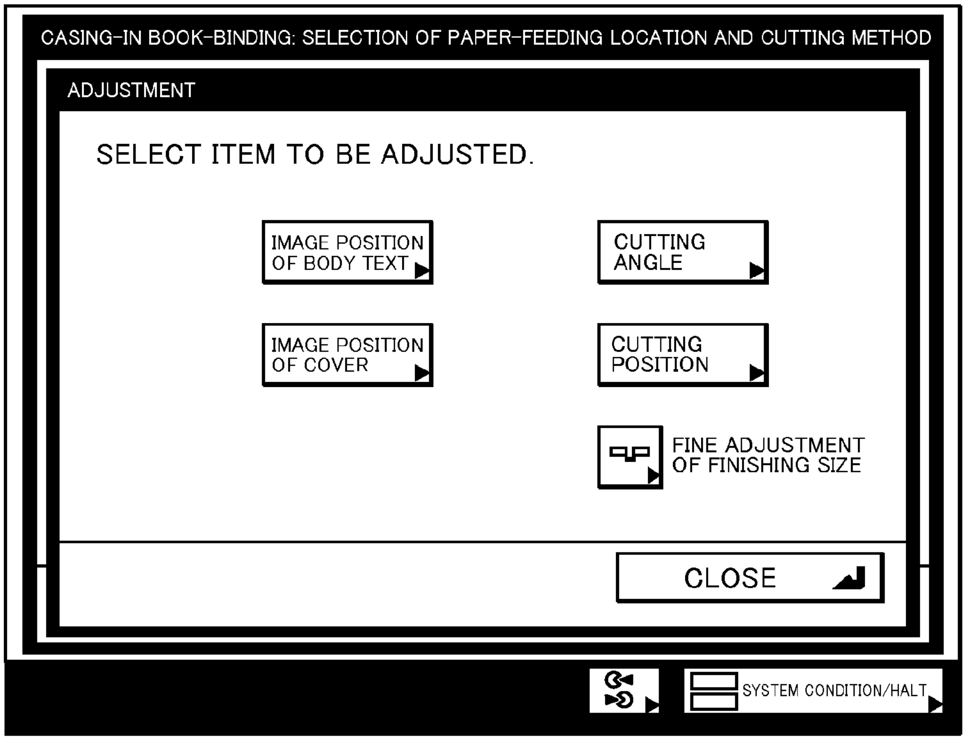
FIG. 21C is a diagram illustrating one of the setting screens.
Figure 21D:
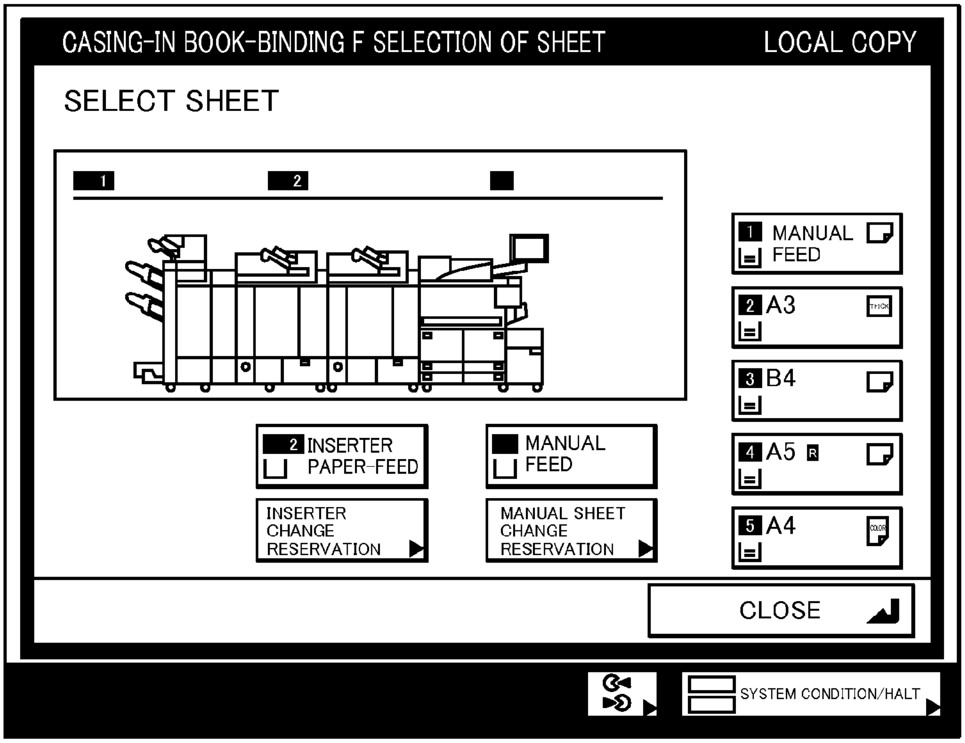
FIG. 21D is a diagram illustrating one of the setting screens.
Figure 21E:
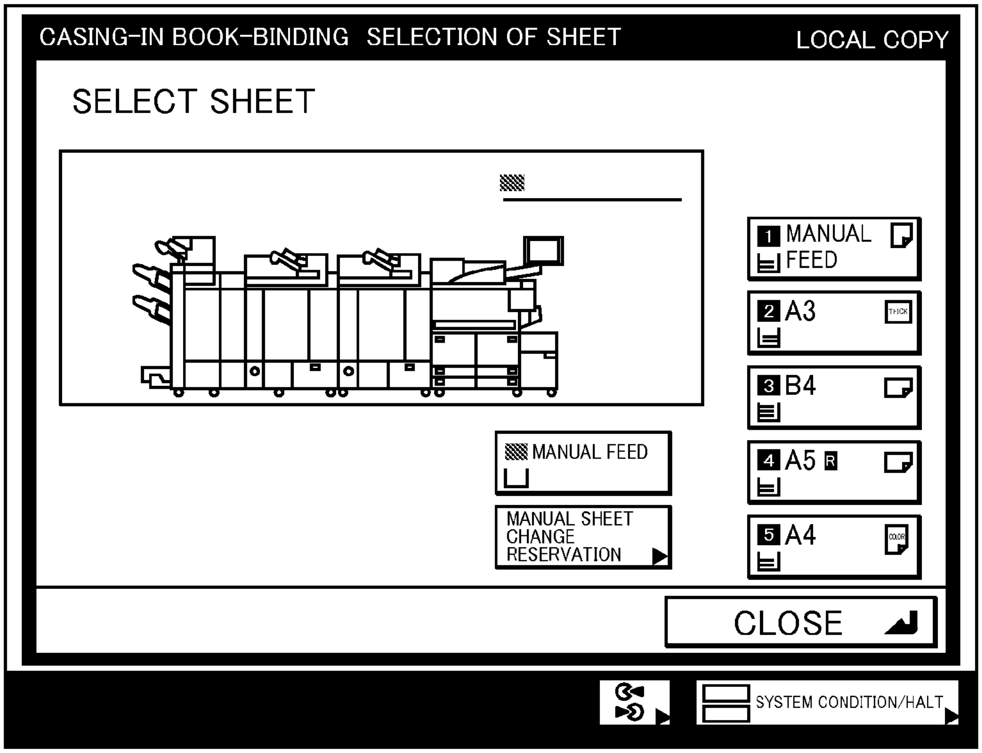
FIG. 21E is a diagram illustrating one of the setting screens.

First, in a cover setting 2101 of FIG. 21B, a button 2101*a* indicating a current setting is displayed, and when the operator pushes down this button 2101*a*, the setting screen as illustrated in FIG. 21D is displayed on the touch panel unit 401 thereby, the cover setting is executed. In a body text setting 2102 of FIG. 21B, a button 2102*a* indicating a current setting is displayed, and when the operator pushes down this button 2102*a*, the setting screen as illustrated in FIG. 21E is displayed on the touch panel unit 401 thereby, the body text setting is executed.

In a cutting setting 2103 of FIG. 21B, the three cutting methods of not-cutting, one side cutting, and three sides cutting is selectively displayed, and thereby causing the operator to select one of the methods, the cutting setting is executed. In FIG. 21B, an adjusting button 2104 is displayed, and when the operator pushes down this button 2104, the setting screen as illustrated in FIG. 21C is displayed on the touch panel unit 401, thereby, the fine adjusting setting for the cutting is executed.

Figure 21F:
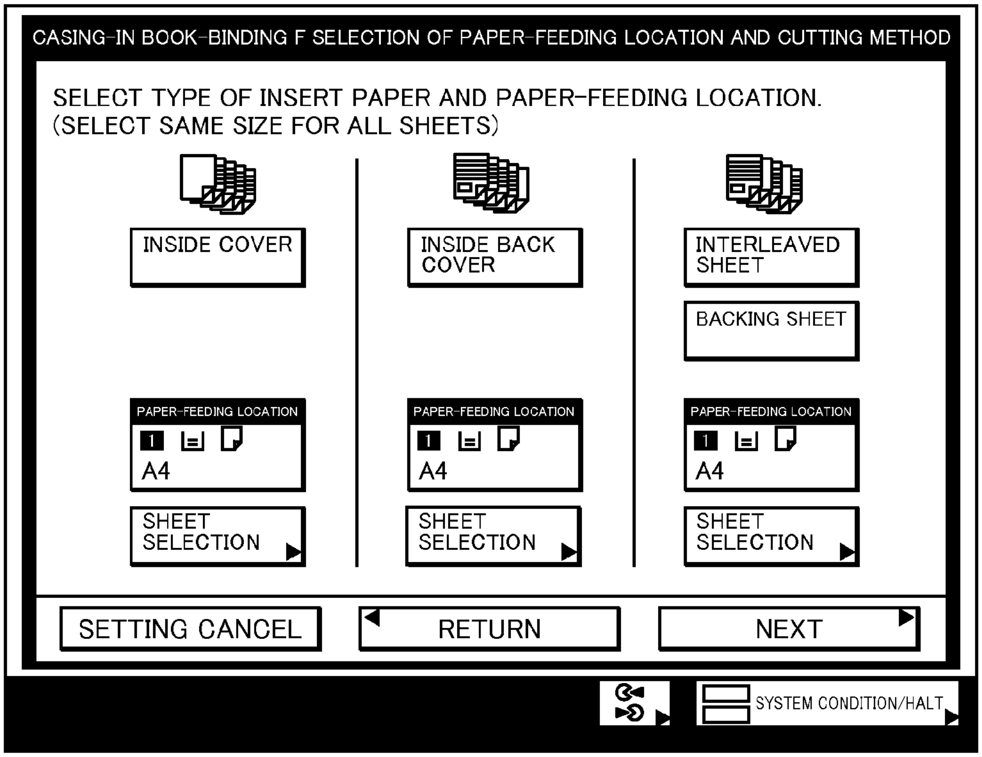
FIG. 21F is a diagram illustrating one of the setting screens.

A insert paper setting button 2105 of FIG. 21B is displayed, and when the operator pushes down this button 2105, the setting screen as illustrated in FIG. 21F is displayed on the touch panel unit 401 thereby, the insert paper setting, or the like is executed.

As described above, since a plurality of settings are necessary to set the casing-in book-binding process, the operator needs to spend a long time to set the casing-in book-binding process. Thus, before starting the setting work described by using FIG. 21A to FIG. 21F (specifically, before step S1209), steps for selecting data as a target (step S1204 to step S1207) are previously executed. Next, the above setting work for the casing-in book-binding process job (following steps of step S1209), and a data obtaining work (step S1209) are executed in parallel (at the same time). Thereby, it becomes no need for the operator to be conscious of the completion of the data obtaining work, and a processing time can be reduced.

Figure 14:
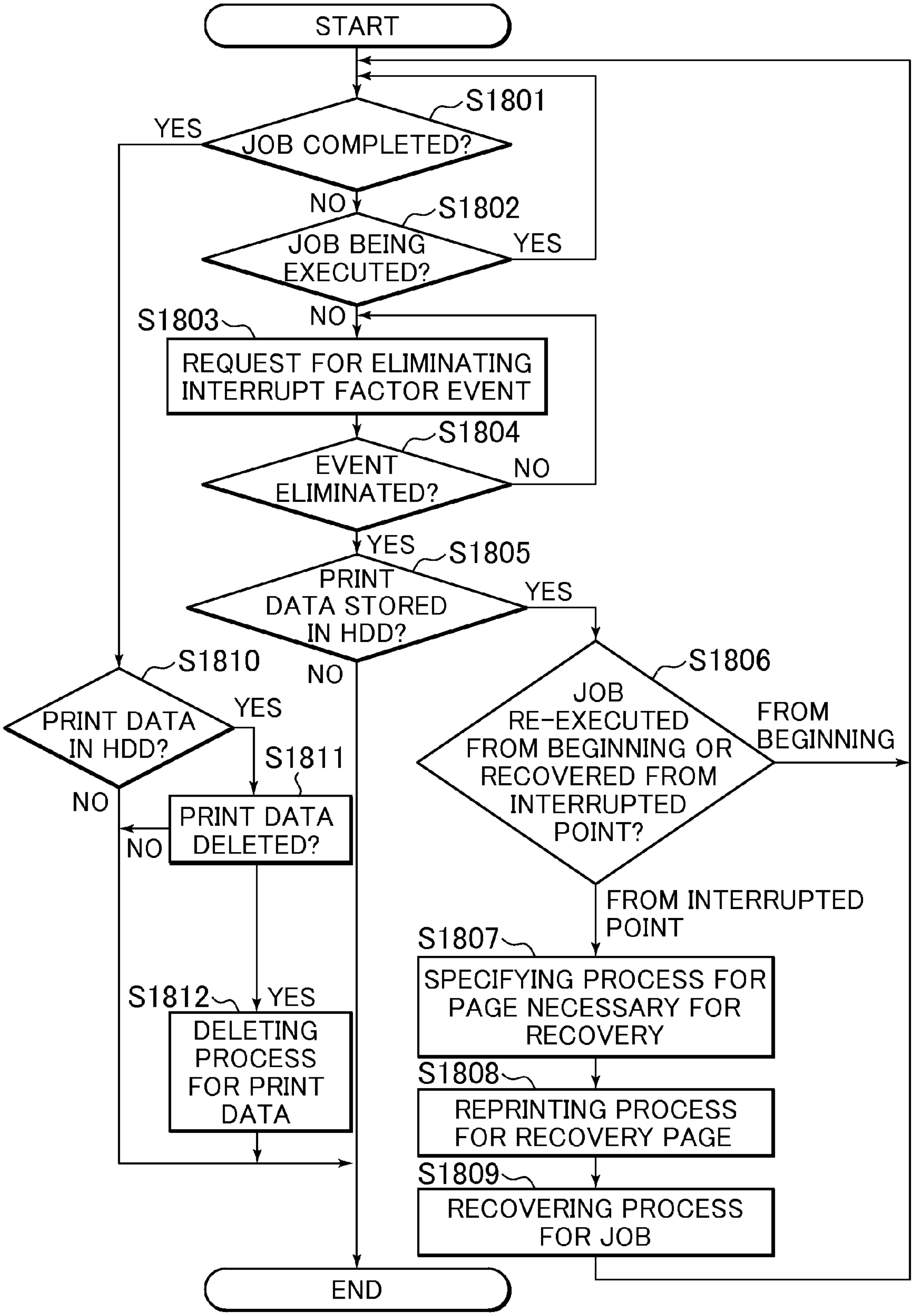
FIG. 14 is a flowchart showing a procedure in step S1210 of FIG. 9B executed by the printing system.

FIG. 14 is a flowchart showing a procedure in step S1210 of FIG. 9B executed by the printing system 1000. When the present process, that is, the executing process for the sheet-processing only job using the interrupt recovering function, is started, the controlling unit 205 first determines whether or not the job has been completed (step S1801). When the job has not been completed, next, the controlling unit 205 determines whether or not the job is being processed (step S1802). When it is determined that the job is not being processed, it is determined that any job interrupting factor event has been induced, and it has been interrupted to process the job.

Figure 15:
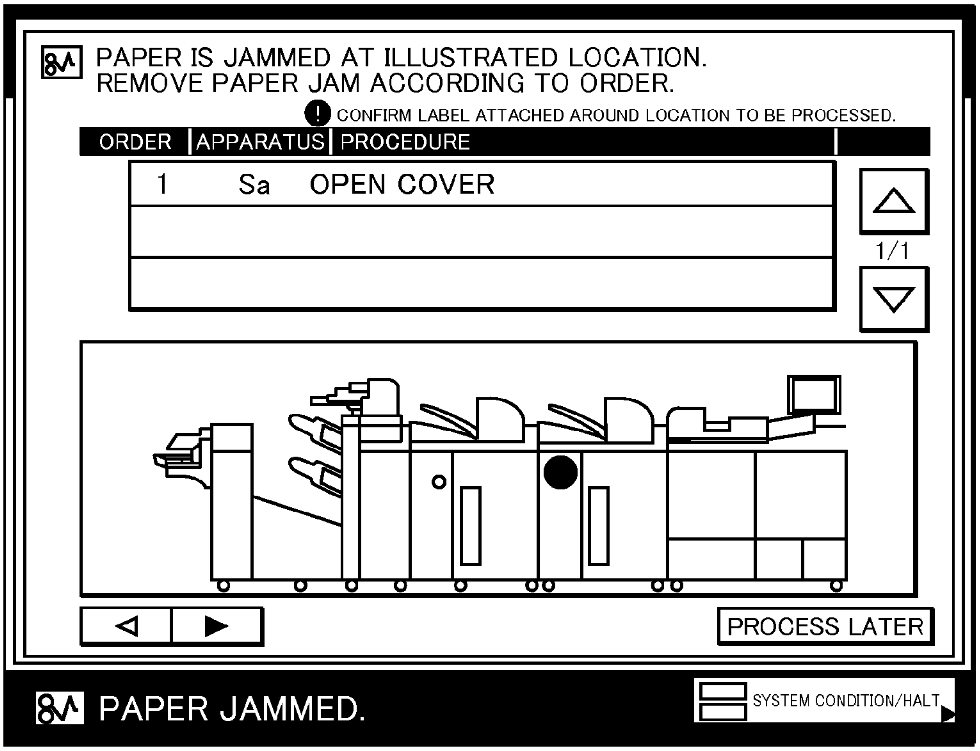
FIG. 15 is a diagram illustrating one of the setting screens.

In this case, the controlling unit 205 specifies the job interrupting factor event, and causes the touch panel unit 401 provided in the operation unit 204 to display an error for notifying a fact for requesting the event to be eliminated (step S1803). FIG. 15 is a diagram illustrating one of the setting screens displayed on the touch panel unit 401 when the factor specified by the controlling unit 205 is a sheet jam in the large-capacity stacker 200-3*a* connected to the sheet-processing apparatus 200.

Figure 16:
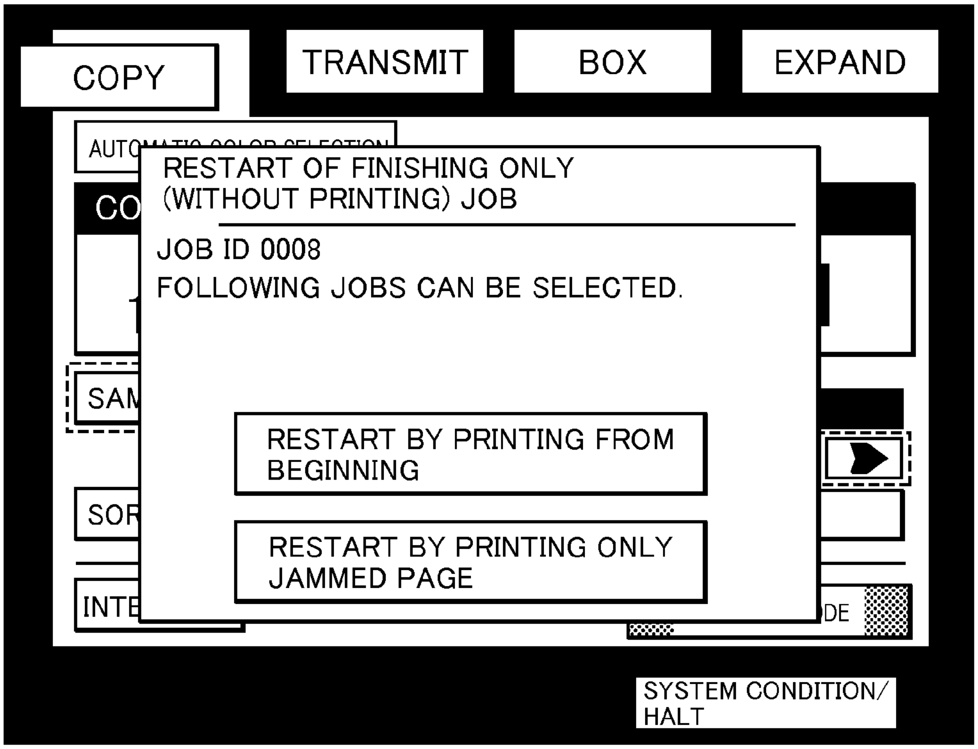
FIG. 16 is a diagram illustrating one of the setting screens.

Next, the controlling unit 205 confirms that the job interrupting factor event is eliminated (step S1804), and later, determines whether the print data of the job is stored in the HDD 209 (step S1805). When the print data of the job is stored in the HDD 209, the controlling unit 205 displays the setting screen as illustrated in FIG. 16 on the touch panel unit 401. Next, the controlling unit 205 causes the operator to determine whether to retry to print from the beginning in the printing unit 203 to re-execute the job, or to re-print only the page lost because of the job interrupting factor event to recover from the interrupted point (step S1806).

When the operator selects the recovery from the interrupted point ("FROM INTERRUPTED POINT" at step S1806), the controlling unit 205 executes a specifying process for the page lost because of the job interrupting factor event (step S1807). Here, a plurality of sheet detecting sensors are provided in a sheet transporting path of the printing system 1000, which are used to detect a sheet transporting condition and a sheet jam. By using the sensors, it is possible to specify the page which is normally discharged and the page in which the interrupting event such as the sheet jam is induced. Next, the controlling unit 205 reprint the page specified at step S1807 in the printing unit 203 (step S1808). The controlling unit 205 executes a job recovering (restarting) process including the printed page (step S1809).

Meanwhile, in this case, the alternative may be provided that the reprinting is not executed, and only the sheet-processing is restarted from the interrupted point. This is because there particularly exists the concept in the POD printing field that the peculiarity of each printing system, the color difference between respective printers, or the like is despised, and it is desired to print one group of results by using the same printing engine.

In this case, the operator executes the process that the page lost because of the interrupting event is specified, the page is printed again by using other printing system (for example, the printing system 1001), the reprinted page is set again in the printing system 1000, and the job is restarted. Meanwhile, the controlling unit 205 and the printing system 1000 may be configured so that, after the page lost because of the job interrupting event is specified, information on the page is displayed on the touch panel unit 401 provided in the operation unit 204.

Figure 17:
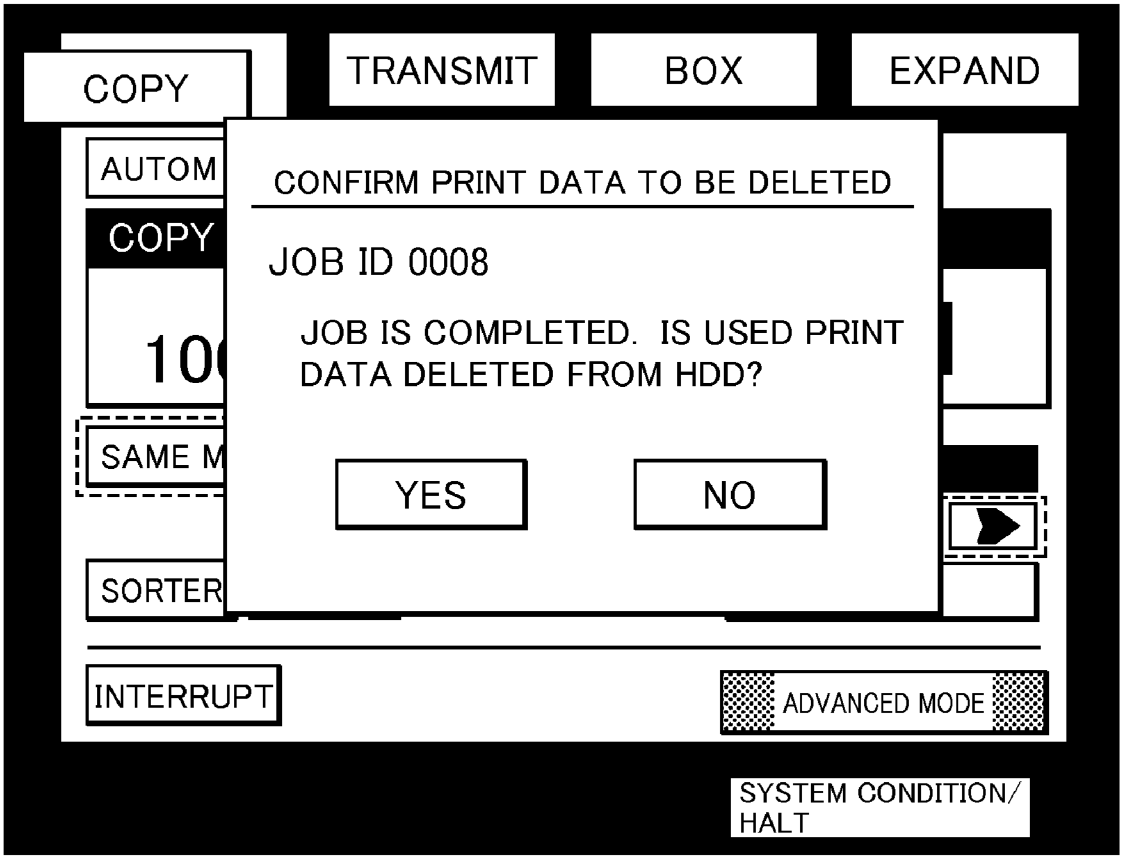
FIG. 17 is a diagram illustrating one of the setting screens.

When the job is completed, the controlling unit 205 confirms whether the print data of the job is stored in the HDD 209 (step S1810). When the print data of the job is stored, the controlling unit 205 displays the setting screen as illustrated in FIG. 17 on the touch panel unit 401, and confirms with the operator whether or not the print data is deleted (step S1811). When the operator selects that the print data is deleted, the controlling unit 205 executes the deleting process for the print data, and terminates the job processing (step S1812).

EXAMPLE 2

The printing system 1000 receives the print data from the scanning unit 201, the server computer 103, and the client computer 104 through the network 101 and the external I/F 202, and can store the received print data in the HDD 209. In this case, job setting information set to the job, such as the sheet-processing and the number of sheets, is also stored. It is also possible to store only this job setting information in the HDD 209 even if the print data is not included. A list of the jobs stored in the HDD 209 can be displayed on the touch panel unit 401 provided in the operation unit 204.

The list of the jobs can be also transmitted to the server computer 103 and the client computer 104, or other printing system 1001 through the network 101 and the external I/F 202. Thereby, the operator can operate the printing system 1000, for example, on the screen of the client computer 104.

Figure 18:
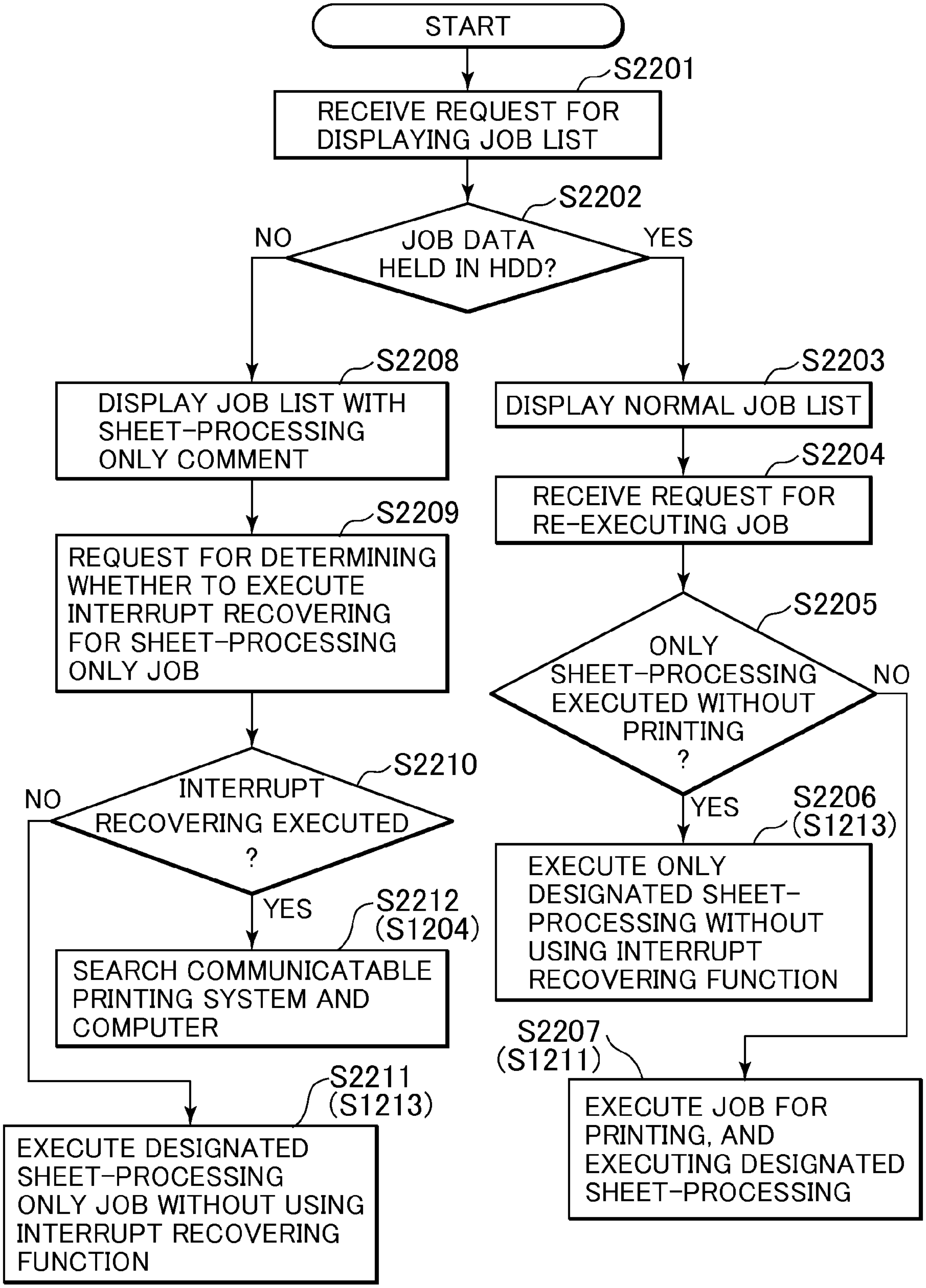
FIG. 18 is a flowchart showing a procedure of an executing process for a sheet-processing job, which is executed by the printing system, and is stored in an HDD.

FIG. 18 is a flowchart showing a procedure of an executing process for a sheet-processing job, which is executed by the printing system 1000, and is stored in the HDD 209.

First, the controlling unit 205 receives a display request for a job list from the user (step S2201). When receiving the display request, the controlling unit 205 first searches the job setting information in the HDD 209, and determines for each found job whether or not the print data of the found job is also stored in the HDD 209 (step S2202).

Figure 19:
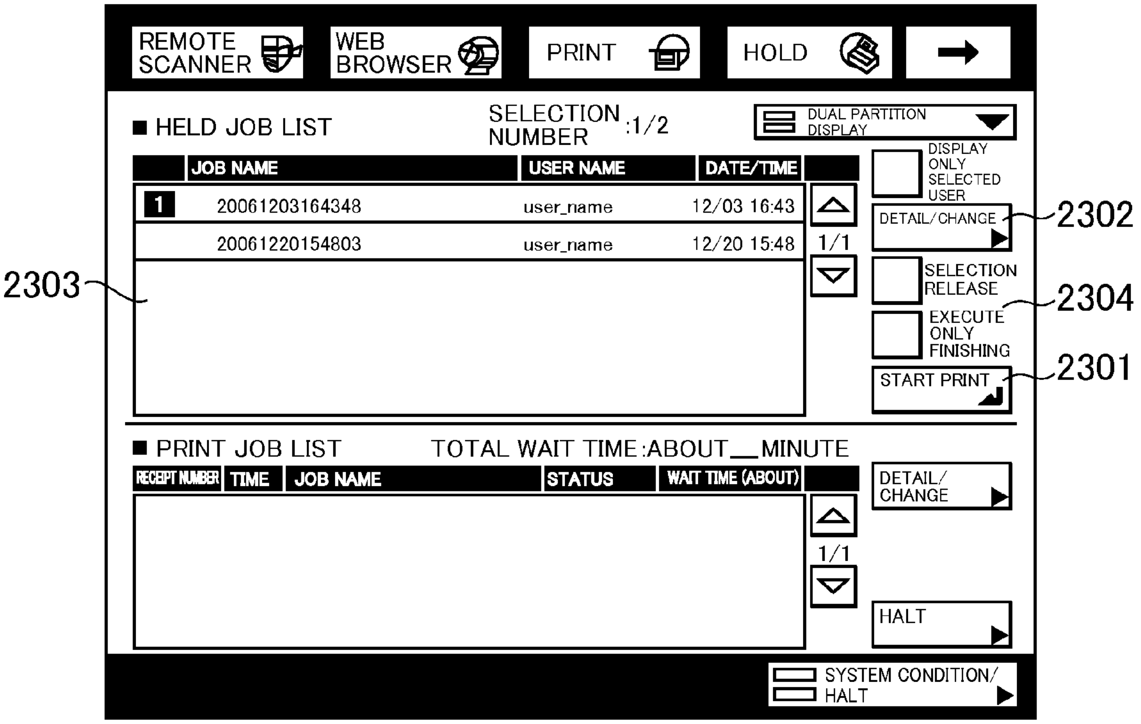
FIG. 19 is a diagram illustrating one of the setting screens.

Next, for the job, in which it is determined at step S2202 that the print data is also stored, the setting screen as illustrated in FIG. 19 is displayed on the touch panel unit 401 (step S2203). Here, the operator can select the job to be executed in a job list displaying area 2303 of FIG. 19. When the operator pushes down a print starting button 2301, the selected job can be printed. When the operator pushes down a setting changing button 2302, the job setting of the selected job can be changed.

Here, when the operator selects the job, in which it is determined at step S2202 that the print data is also stored, in the job list displaying area 2303, the following displaying is executed. As illustrated in FIG. 19, a selecting button 2304 for selecting whether only the sheet-processing (post-processing and finishing) is executed is displayed. After the operator operates this selecting button 2304, and when the operator pushes down the print starting button 2301, the controlling unit 205 determines that a re-execution request for the job is received (step S2204). When the re-execution request for the job is executed at step S2204, the controlling unit 205 checks the setting of the selecting button 2304 displayed at step S2203, and determines whether the setting corresponds to the job in which only the sheet-processing is executed, or the job in which the printing and the sheet-processing are executed (step S2205).

Next, when it is determined at step S2205 that the setting corresponds to the job in which only the sheet-processing is executed, the controlling unit 205 controls the printing unit 203 and the sheet-processing apparatus 200 to execute the processing which is the same as that of step S1213 described in FIG. 9B (step S2206).

When it is determined at step S2205 that the setting corresponds to the job in which the printing and the sheet-processing are executed, the controlling unit 205 controls the printing unit 203 and the sheet-processing apparatus 200 to execute the processing which is the same as that of step S1211 described in FIG. 9B (step S2207).

Figure 20:
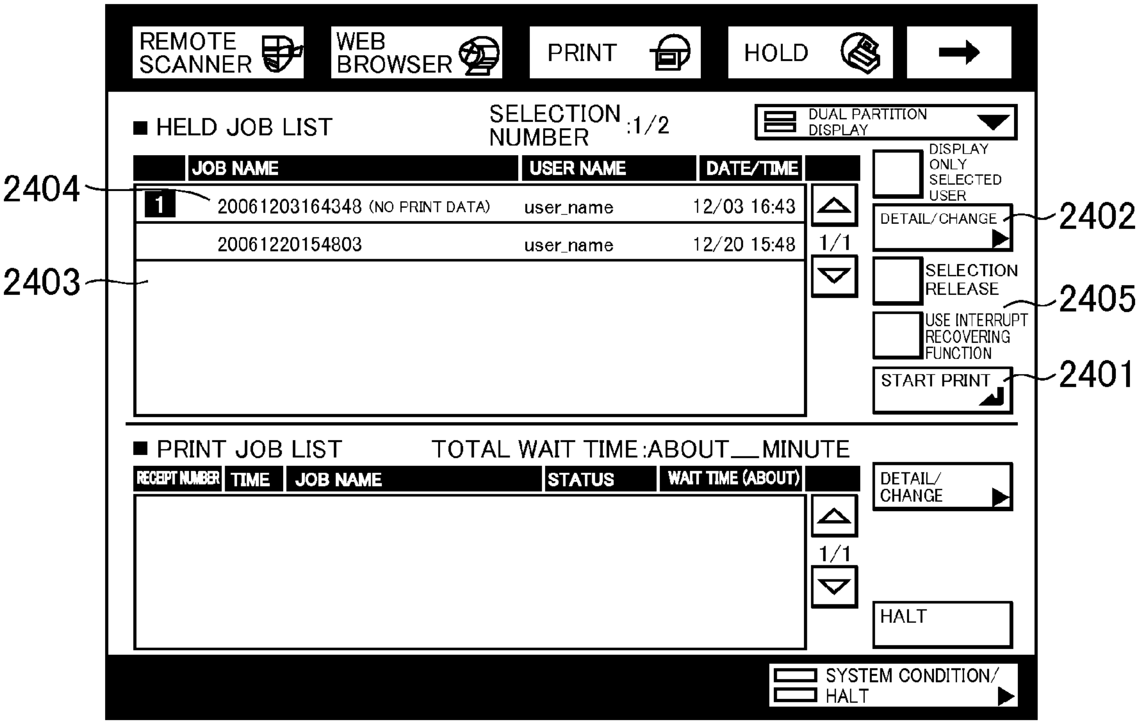
FIG. 20 is a diagram illustrating one of the setting screens.

On the other hand, for the job, in which it is determined at step S2202 that the print data is not stored, the setting screen as illustrated in FIG. 20 is displayed on the touch panel unit 401 (step S2208). Here, as in FIG. 19, the operator can select the job to be executed in a job list displaying area 2403. Meanwhile, for the job, in which it is determined that the print data is not stored, a comment 2404 informing such a fact is displayed along with a name of the job. By pushing down a print starting button 2401, the selected job can be printed. In addition, by pushing down a setting changing button 2402, the job setting of the selected job can be changed.

Such a case is considered that the operator selects the job, in which it is determined at step S2202 that the print data is not stored, in the job list displaying area 2403. In this case, a selecting button 2405 as illustrated in FIG. 20 is displayed on the touch panel unit 401, for causing the operator to select whether or not to execute the job processing while being conscious of recovering an error when any processing interrupting event (jam, or the like) is induced. Thereby, the controlling unit 205 requests the operator to determine whether or not to execute the interrupt recovering of the sheet-processing only job (step S2209). When the operator pushes down one of this selecting button 2405, and pushes down the print starting button 2401, according to the button pushed by the operator of the selecting button 2405 displayed at step S2208 the controlling unit 205 determines whether or not to execute the job processing while being conscious of the error recovery (step S2210).

Next, when it is determined at step S2210 that the job selected by the user is a job not executing the job processing while being conscious of the error recovery, the controlling unit 205 executes the following control. The controlling unit 205 controls the printing unit 203 and the sheet-processing apparatus 200 to execute the same processing as that of step S1213 described in FIG. 9B (step S2211).

Next, when it is determined at step S2210 that the job selected by the user is a job executing the job processing while being conscious of the error recovery, the controlling unit 205 controls the printing system 1000 to execute the same processing as that of step S1204 described in FIG. 9B (step S2212).

That is, the controlling unit 205 searches, through the external I/F 202 and the network 101, the printing system 1001, the server computer 103 (PC 103), or the client computer 104 (PC 104) which can communicate with the controlling unit 205. The controlling unit 205 displays a list of the searched printing system or the like by using a screen as illustrated in FIG. 11, proposes the list as the selection candidate to the operator, and causes the operator to select the one thereof. The following flow is the same as that of FIG. 9A and FIG. 9B.

Meanwhile, as described above, the printing system 1000 of the present embodiment is configured so that a variety of the configurations of the printing system 1000 can be combined in any manner within a consistent scope.

Here, as described above, a computer-readable storing medium, in which a program code of software realizing a function of the above embodiment is recorded, is delivered to a system or an apparatus. It is apparent that, since a computer (or, CPU or MPU) of the system or the apparatus reads out and executes the program code stored in the storing medium, an object of the present invention can be also achieved. In this case, the program code itself read out from the storing medium realizes a new function of the present invention.

That is, the following storing medium and/or the program itself (program product) are configured in the present invention. The above storing medium is a storing medium storing a computer-executable program including a program code for causing a computer system to execute a variety of methods corresponding to a variety of structures of the above present embodiment. Thus, when the function of such a computer-executable program is included, the form of the above program may be an object code, a program executed by an interpreter, a scripter supplied to an OS, or the like.

The following storing media can be used as the storing medium for delivering the program: a flexible disk; a hard disk; an optical disk; a magnet-optical disk; an MO; a CD-ROM; a CD-R; a CD-RW; a magnetic tape; a nonvolatile memory card; a ROM; a DVD; or the like. In this case, the program code itself read out from the storing medium realizes a function of the above embodiment, and the storing medium storing such a program code is configured in the present invention.

The following is also a method for delivering the program. That is, the printing system is connected to a home page of the Internet by using a browser of the client computer. The program can be also delivered by downloading, from this home page, the computer program itself of the present invention, or a file which is compressed and includes an automatic installing function to the storing medium such as the hard disk. The program can be also delivered by dividing the program code configured in the program of the present invention to a plurality of files, and downloading each of the files from the different home page. That is, the claims of the present invention also include the WWW server, the ftp server, and the like which cause a plurality of the users to download the program file for realizing a functional process of the present invention with a computer.

The program of the present invention is encrypted, and is stored in the storing medium such as the CD-ROM to be delivered to the user, and key information for decrypting the encrypted program is downloaded from the home page to the user clearing a predetermined condition through the Internet. The encrypted program is decrypted by using the key information to be installed in the computer, thereby, the functional process of the present invention can be realized.

Since the program code read out by the computer is executed, the function of the above embodiment is realized, and also based on an instruction of the program code, the OS (Operating System) running on the computer, or the like executes a part or all of the actual processing. Thus, it is apparent that the present invention also includes such a case that the function of the above embodiment is realized by such a processing.

It is assumed that the program code read out from the storing medium is written in a memory provided in a function expanding board inserted to the computer or a function expanding unit connected to the computer. In this case, based on an instruction of the program code, the CPU, or the like provided in the function expanding board or the function expanding unit executes a part or all of the actual processing. Thus, it is apparent that the present invention also includes such a case that the function of the above embodiment is realized by such a processing.

The present invention may be applied to a system configured with a plurality of apparatuses, and may be applied to a system configured with one apparatus. It is apparent that the present invention can adapt to such a case that the present invention can be achieved by delivering a program to the system or the apparatus. In this case, since the storing medium storing the program expressed by software for achieving the present invention is read out to such a system or such an apparatus, the system or the apparatus becomes able to enjoy the advantage of the present invention.

The present invention is not limited to the present embodiment, a variety of modifications (including an organic combination of each embodiment) can be made based on a concept of the present invention, and such modifications are not eliminated from the scope of the present invention.

A variety of the above advantages can be obtained in the present embodiment in which the system configuration is provided with a variety of configurations. However, the system configuration may not be configured with all of such configurations. For example, the configuration, in which only the controlling for the main part related to the above embodiment can be executed, can be applied to the present embodiment. In the present embodiment, while such a configuration is exemplified that the controlling unit 205 executes an operating control for the above operation unit 204 and an outputting control for the actual printing operation by the printing system 1000, the operation control may be configured to be executed by another controlling unit which is an operation controlling unit.

For example, in the present embodiment, the configuration is exemplified, in which a plurality of the above controls are executed by the controlling unit 205 provided in the printer 100. However, the printing system may be configured so that a different controlling unit other than the controlling unit 205 executes a part or all of a plurality of the above controls. For example, as the different controlling unit other than the controlling unit 205, the following units are caused to be able to be utilized: an external controller whose cabinet is different from that of the printer 100; a CPU of a remote external apparatus such as the PC 104; and a CPU provided in an inline finisher. Thereby, such an advantage can be further improved that the printing environment becomes able to be constructed, which is suitable to the printing environment in which the printing system 1000 can be installed, and is rich of the flexibility.

In the present embodiment, the printer 100 is provided with a plurality of components according to a system in which the post-processing by the post-processing unit connected to the printing unit can be utilized without printing by such a printing unit. However, the present invention is not limited thereto. For example, the present invention also includes the printing unit, the post-processing apparatus, and/or the printing system which are provided with at least any of a plurality of such components.

In the above embodiment, while the configuration is exemplified, in which the controlling unit 205 functions as a unit executing a plurality of the determinations and the controls for this system, the present invention is not limited thereto. For example, the printing system may be configured so that some determinations and/or controls of a plurality of the determinations and/or the controls to be executed by the above controlling unit 205 are executed by other unit. Thereby, for example, the present invention is also applied to the configuration in which the apparatus and/or the system are controlled by one CPU, and the configuration in which the apparatus and/or the system are controlled by a plurality of the cooperating CPUs.

As described above, according to the present embodiment, the convenient printing system becomes able to be provided, in which the future digital printing system is forecasted. For example, it becomes possible to construct the convenient and flexible printing environment which can deal with a use case and a need which can be supposed in the conventionally-supposed POD environment, and it becomes possible to provide a variety of systems for the practical product.

As described above, while a variety of examples and embodiments of the present invention have been described, it is apparent for those skilled in the art that the concept and the scope of the present invention are not limited to the specific description in the present specification.

While the present invention has been described with reference to exemplary embodiments, it is to be understood that the invention is not limited to the disclosed exemplary embodiments. The scope of the following claims is to be accorded the broadest interpretation so as to encompass all the modifications, equivalent structures and functions.

This application claims the benefit of Japanese Patent Application No. 2007-264756 filed Oct. 10, 2007, which is hereby incorporated by reference herein in its entirety.

What is claimed is:

1. A printing apparatus, comprising:

an execution request receiving unit configured to receive an execution request for a specific type of job executing a post-processing by a post-processor connected to a printer without printing by the printer;

a first controlling unit configured to cause the post-processor to execute the post-processing for a first printed matter previously generated for the specific type of job without printing by the printer in a case where said execution request receiving unit receives the execution request;

a print data receiving unit configured to receive, for recovery of the first printed matter, print data used for generating a second printed matter corresponding to the first printed matter;

a second controlling unit configured to cause the printer to generate the second printed matter in accordance with the print data received by said print data receiving unit, in a case where an interruption factor occurs while the post-processing for the first printed matter is executed; and a deleting unit configured to delete the print data in a case where the post-processing for the first printed matter is completed.

2. The printing apparatus according to claim 1, wherein said second controlling unit causes said print data receiving unit to previously receive the print data without waiting for the interruption factor in the post-processing and/or receipt of a generation request for the second printed matter, and causes the printer to wait for a start of generating the second printed matter.

3. The printing apparatus according to claim 1, further comprising a managing unit configured to manage, without treating a job for causing the printer to generate the second printed matter as the specific type of job, the job as a non-specific type of job.

4. The printing apparatus according to claim 1, wherein in a case where said second controlling unit causes the printer to generate the second printed matter, said second controlling unit causes the printer to execute the printing for generating the second printed matter, and then controls the post-processor to be able to execute a post-processing, a type of which is the same as or different from a type of the post-processing, for the second printed matter.

5. The printing apparatus according to claim 1, wherein after the post-processor executes the post-processing for the first printed matter, in response to receiving a generation request for the second printed matter through a user interface, said second controlling unit controls the printer to be able to generate the second printed matter.

6. The printing apparatus according to claim 1, further comprising a determining unit configured to execute, when the execution request is received, at least one of a determination whether or not an instruction for causing said print data receiving unit to receive the print data and/or information for designating an obtaining destination of the print data are inputted through the user interface, and a determination whether or not there exists the print data in a storing unit accessible by the printer, and wherein said second controlling unit determines, based on a result of the determination by said determining unit, whether or not the printer can generate the second printed matter.

7. A controlling method for a printing apparatus, comprising:

an execution request receiving step of receiving an execution request for a specific type of job executing a post-processing by a post-processor connected to a printer without printing by the printer;

a first controlling step of causing the post-processor to execute the post-processing for a first printed matter previously generated for the specific type of job without printing by the printer in a case where the execution request is received in said execution request receiving step;

a print data receiving step of receiving, for recovery of the first printed matter, print data used for generating a second printed matter corresponding to the first printed matter;

a second controlling step of causing the printer to generate the second printed matter in accordance with the print data received in said print data receiving step, in a case where an interruption factor occurs while the post-processing for the first printed matter is executed; and a deleting step of deleting the print data in a case where the post-processing for the first printed matter is completed by the post-processor.

8. A non-transitory computer-readable storage medium for storing a computer executable program for causing a computer to implement the controlling method according to claim 7.

* * * * *